US011080804B1

(12) United States Patent
Wolf et al.

(10) Patent No.: US 11,080,804 B1
(45) Date of Patent: Aug. 3, 2021

(54) MODEL FOR REPRESENTING ONLINE OWNERSHIP INFORMATION

(71) Applicant: Google Inc., Mountain View, CA (US)

(72) Inventors: Stanley Wolf, Palo Alto, CA (US);
Kevin Montler, Pleasanton, CA (US);
Colby Ranger, Millbrae, CA (US)

(73) Assignee: Google LLC, Mountain View, CA (US)

( * ) Notice: Subject to any disclaimer, the term of this patent is extended or adjusted under 35 U.S.C. 154(b) by 675 days.

(21) Appl. No.: 15/381,541

(22) Filed: Dec. 16, 2016

(51) Int. Cl.
*G06Q 50/18* (2012.01)
*G06F 16/24* (2019.01)
*G06F 16/22* (2019.01)
*G06F 16/28* (2019.01)
*G06F 16/2457* (2019.01)

(52) U.S. Cl.
CPC ....... *G06Q 50/184* (2013.01); *G06F 16/2282* (2019.01); *G06F 16/24573* (2019.01); *G06F 16/289* (2019.01)

(58) Field of Classification Search
None
See application file for complete search history.

(56) References Cited

U.S. PATENT DOCUMENTS

| | | | |
|---|---|---|---|
| 2007/0156726 A1* | 7/2007 | Levy | G06F 21/10 |
| 2008/0228733 A1* | 9/2008 | Davis | H04N 21/26606 |
| 2009/0150199 A1* | 6/2009 | Cohen | G06Q 10/0637 |
| | | | 705/7.36 |
| 2011/0202430 A1* | 8/2011 | Narayanan | G06Q 10/10 |
| | | | 705/27.1 |
| 2012/0101948 A1* | 4/2012 | Aydar | G06F 21/10 |
| | | | 705/59 |
| 2014/0344170 A1* | 11/2014 | Le Chevalier | G06Q 50/184 |
| | | | 705/310 |
| 2015/0161750 A1* | 6/2015 | Bugir | G06F 16/258 |
| | | | 705/310 |

(Continued)

FOREIGN PATENT DOCUMENTS

WO    WO-2006037162 A1 *  4/2006 ......... G11B 27/3027

OTHER PUBLICATIONS

O. B. Arewa "YouTube, UGC, and Digital Music: Competing Business and Cultural Models in the Internet Age", Northwestern University Law Review, vol. 104, No. 2, (2010).*

*Primary Examiner* — Neha Patel
*Assistant Examiner* — Clay C Lee
(74) *Attorney, Agent, or Firm* — Lowenstein Sandler LLP

(57) ABSTRACT

In a rights system, a plurality of asserted and reconciled assets are maintained. For example, asserted and reconciled assets can be maintained in a table structure of the rights system. Each asserted asset can associated an asset with an owner and additionally include descriptive data describing the asset. Asserted assets can be created by the rights system based on descriptive data provided to the rights system by owners of assets. In contrast, reconciled assets are generated by the right system by associating one or more asserted assets. The set of asserted assets can be modified, both through updates to the descriptive data of existing asserted assets, and through the generation of new asserted assets based on additional descriptive data. Based on the modifications to the asserted assets, the set of reconciled assets can be modified to reflect new or corrected information present in the set of asserted assets.

20 Claims, 18 Drawing Sheets

(56) References Cited

U.S. PATENT DOCUMENTS

2015/0347971 A1* 12/2015 D'Amore ............. G06Q 10/101
                                                     705/300
2016/0306863 A1* 10/2016 Accardo ............... G06F 16/258
2016/0353169 A1* 12/2016 Miller .................... H04L 67/02

* cited by examiner

MODEL FOR REPRESENTING ONLINE OWNERSHIP INFORMATION

TECHNICAL FIELD

This description generally relates to the management of online content. More specifically, this description relates to a data model for handling asset ownership information.

BACKGROUND

The proliferation of web sites that allow users to upload media content for online consumption has brought with it a number of challenges, such as managing and uploaded content in which other entities have ownership rights in view of changing information regarding those rights.

Intellectual property laws of the United States and other countries may allow a single work, idea, invention, design, etc. to have multiple, different rights holders. For example, the composer, publisher, and music label are just some of the many different owners that may have different rights to a song recording and each entity may be entitled to at least partially control the use of their work, and/or to receive royalty payments under the various royalty schemes in force in a particular country. Videos, as another example, often have multiple layers of intellectual property rights complexity, including rights regarding music played along with the video and as well as rights associated with video content derived from other works.

Due to the large number of media content items and the potentially complex structure of ownership rights for each content item, errors and inconsistencies in information about ownership rights can be common, arising from lack of knowledge, incorrect record keeping or data entry, or for other reasons. Objective "truth" regarding what the correct information can be impossible to know. Current systems for storing and managing data about ownership rights associate each asset (which may be associated with a number of media content items associated with a same ownership right) with a single data object containing all known information concerning the ownership rights of that asset. While this model allows for information regarding the asset to be centralized, as all owners of the asset can contribute information to the object, it can also result in conflicting or incorrect information about the asset being incorporated into the object in a way that cannot easily be remedied at a later date.

For example, an owner of one asset may incorrectly provide ownership rights information as being associated with another asset instead. As another example, an owner might provide information that is correct but insufficiently distinguishing so as to disambiguate between different aspects of the asset's ownership rights. As another example, two different owners associated with the same asset may both provide incorrect information versus some unknown objective truth and where the provided information is contradictory between the two different owners.

Validating and correcting all entered data is difficult. However, incorrect data can be even more problematic where incorrect data results in the creation of associations between assets that should remain separate. If such a system has a single object per asset data structure, incorrect information may cause a merge to occur between the two assets. Once the merge is complete, it can be difficult to back out such a merge as it is difficult if not impossible to determine which information should be associated with which asset once the mistake is discovered. If asset information is used to control royalty payments, for example, such an error can make it difficult if not impossible to determine what the correct royalty should have been even if the error itself could be corrected. Manual review of records by staff to try and reverse the error is laborious and time consuming, and has no guarantee of success.

SUMMARY

In a rights system, a plurality of asserted and reconciled assets are maintained. For example, asserted and reconciled assets can be maintained in a table structure of the rights system. Each asserted asset can associated an asset with an owner and additionally include descriptive data describing the asset. Asserted assets can be created by the rights system based on descriptive data provided to the rights system by owners of assets. In contrast, reconciled assets are generated by the right system by associating one or more asserted assets. Each reconciled asset can be associated with one or more asserted assets, but no asserted asset can be associated with more than one reconciled asset. For example, a first reconciled asset can be associated with a first and a second asserted asset.

The set of asserted assets can be modified, both through updates to the descriptive data of existing asserted assets, and through the generation of new asserted assets based on additional descriptive data. In one case a modification to descriptive data can be received that conflicts with descriptive data of another related asserted asset. For example, a modification to descriptive data associated with the second asserted asset can cause the second asserted asset to conflict at least in part with the first asserted asset. To address the introduced conflict, asserted assets associated with the first reconciled asset can be separated into two subsets, a first subset comprising asserted assets with descriptive data overlapping the first asserted asset, and a second subset comprising asserted assets with descriptive data overlapping the second asserted asset. Alternatively, a modification to descriptive data can cause an overlap in descriptive data between one or more asserted assets. Split reconciled assets can then be generated for the first and second sub sets.

The figures of this application depict various embodiments of the present invention for illustration purposes only. Alternative embodiments of the systems and methods illustrated herein can be employed without departing from the principles described herein.

DETAILED DESCRIPTION

I. Overview

Figure 1:
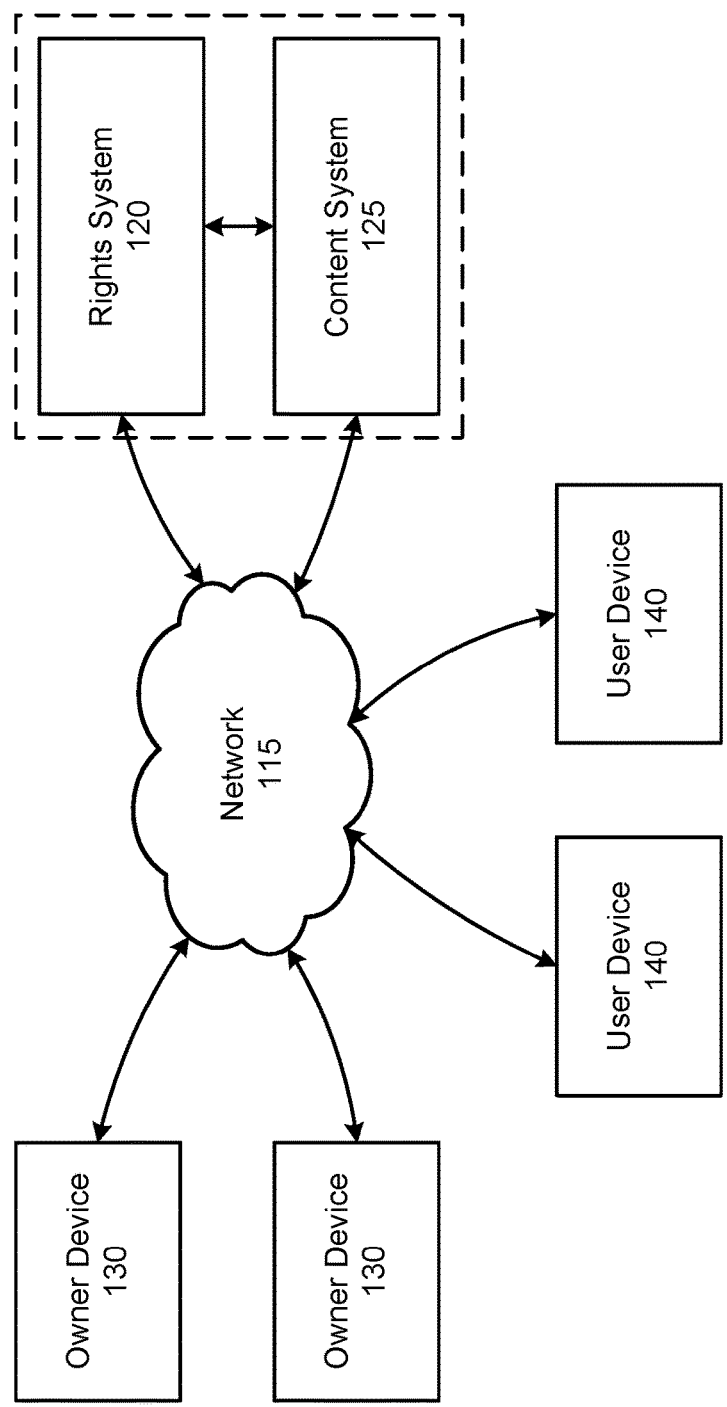
FIG. 1 is a block diagram of an example system environment in which a rights system operates, according to some embodiments.

FIG. 1 is a block diagram of an example computing system environment in which a rights system operates, according to some embodiments. The system environment 100 includes a network 115, rights system 120, content system 125, owner devices 130, and user devices 140. A rights system 120 manages ownership rights over assets associated with content items associated with a content system. Generally, a content item is some form of media, such as a video, audio recording, book or other written document, image, or the like. Content items can include intellectual property owned by one or more different owners. For example a video can be a clip of a copyrighted movie and can include an audio recording of a copyrighted song.

An asset is a discrete item of intellectual property which can be associated with the ownership rights of one or more owners. For example, the copyrighted movie and copyrighted song of the previous example may each be associated with different assets. Examples of types of assets include, but are not limited to, composition (such as of a song), sound recording, film, TV show, video, book, article, or other artistic or creative work. Assets can be incorporated into or be otherwise present in one or more content items, both partially and in full. For example, a content item can simply reproduce an asset or a portion of an asset, such as a content item reproducing a clip of a movie. Alternatively, a content item can incorporate assets, for example a video including a copyrighted song as background audio with overlapping dialogue.

The rights system 120 allows asset owners to submit information regarding their ownership of assets to the rights system 120. In some cases, a single asset can be owned partially by multiple owners in a variety of ways. Examples include, but are not limited to, partial ownership based on geographic region or media type, or based on a percentage ownership split. As owners provide additional information to the rights system 120, the rights system 120 can adapt its understanding of the ownership of assets based on new information. For example, the rights system 120 allows owners, via owner devices 130, to describe assets and affiliated content items that they own rights to via a disclosure graphical user interface (GUI) presented on the owner devices 130. The description of the owned assets are then stored within the rights system 120.

The rights system 120 further allows owners, through a GUI on an owner device 130, to disclose and assert their rights over assets incorporated into content items associated with the content system 125. An ownership claim or "claim" is an indication or statement that a specific content item of the content system 125 comprises an asset owned by an owner or otherwise affects an owner's rights to an asset. Based on receiving a claim from an owner, the rights system 120 can associate a content item with an asset owned by that owner. However, as the content system 125 can contain many content items and owners can own rights to many assets, claims and disclosure of owned assets received from the owners can be incomplete, contradictory, or incorrect, particularly in light of submissions from other owners regarding the ownership of their assets and associated content items.

Therefore, the rights system 120 reconciles ownership claims received from various owners. This may occur in response to provided information about assets, as introduced above. This may also occur in relation to claims made by owners with respect to content items of the content system 125 that owners believe include their owned assets. The rights system 120 combines received information from multiple owners (both disclosure of owned assets and claims regarding content items) to develop as complete a model of ownership rights and asset-content item associations as can be possible given the information submitted by owner. For example, the rights system 120 can generate and update asserted assets based on each owner's description and assertion of their owned assets. Based on the asserted assets, the rights system 120 can generate reconciled assets that represent the rights system's understanding of associations between asserted assets associated with different owners. The rights system 120 is discussed in additional detail below.

The content system 125 is a computing system capable of providing content items to users for consumption. For example, the content system 125 can transmit content items over the network 115 to a user device 130 for display to a user through a graphic user interface (GUI) presented on an associated user device 130. Similarly, users can upload content items to the content system 125 through a user device 130, for example through a GUI of the content system 125. In some situations, the content system 125 may take action based on requests from owners of assets associated with a content item. For example, the content system 125 can restrict a content item from being displayed to some or all users based on a request by an owner associated with an asset included within the content item. The content system 125 is able to access rights information for assets associated with content items from the rights system 120 to determine whether to particular content items are permitted to be presented to particular user devices 130. The rights system 120 can be integrated into the content system 125, connected to the content system 125 over the network 115, directly connected to the content system 125 (for example over an Ethernet connection), or otherwise connected to the content system 125 by any suitable method.

An owner device 130 is a computing device associated with an owner. An owner device can be a desktop or laptop computer, smartphone, tablet, or any other suitable device able to communicate with the rights server 120 over the network 115. An owner device 130 is capable of communicating with the rights system 120 over the network 115.

A user device 140 is a device capable of displaying, playing, or otherwise presenting content items of the content system 125 to a user of the content system 125. A user device is generally also capable of uploading content items to the content system 125. A user device 140 is capable of communicating with the content system 125 over the network 115. Like an owner device 130, a user device 140 can be a desktop or laptop computer, smartphone, tablet, or any other suitable device. As a user may also be an owner, and thus an owner device 130 and user device 140 may in fact be the same device or same type of device. More generally, the distinction between owner and user devices is included in this description to clarify the status of the entity from whom and to whom an information is submitted and received, respectively, via a client device in conjunction with the rights 120 and content 125 systems.

The network 115 connects the rights system 120 and content system 125 to owner devices 130 and user devices 140. The network 115 can be the internet, a LAN (Local Area Network), WAN (Wide Area Network), or wireless network such as a 3G or 4G cellular data network. In some embodiments, the network 115 can utilizes HTTP (Hyper-Text Transport Protocol), TCP/IP, WiFi, Ethernet, or any suitable network technology.

II. Asserted and Reconciled Assets

Figure 2A:
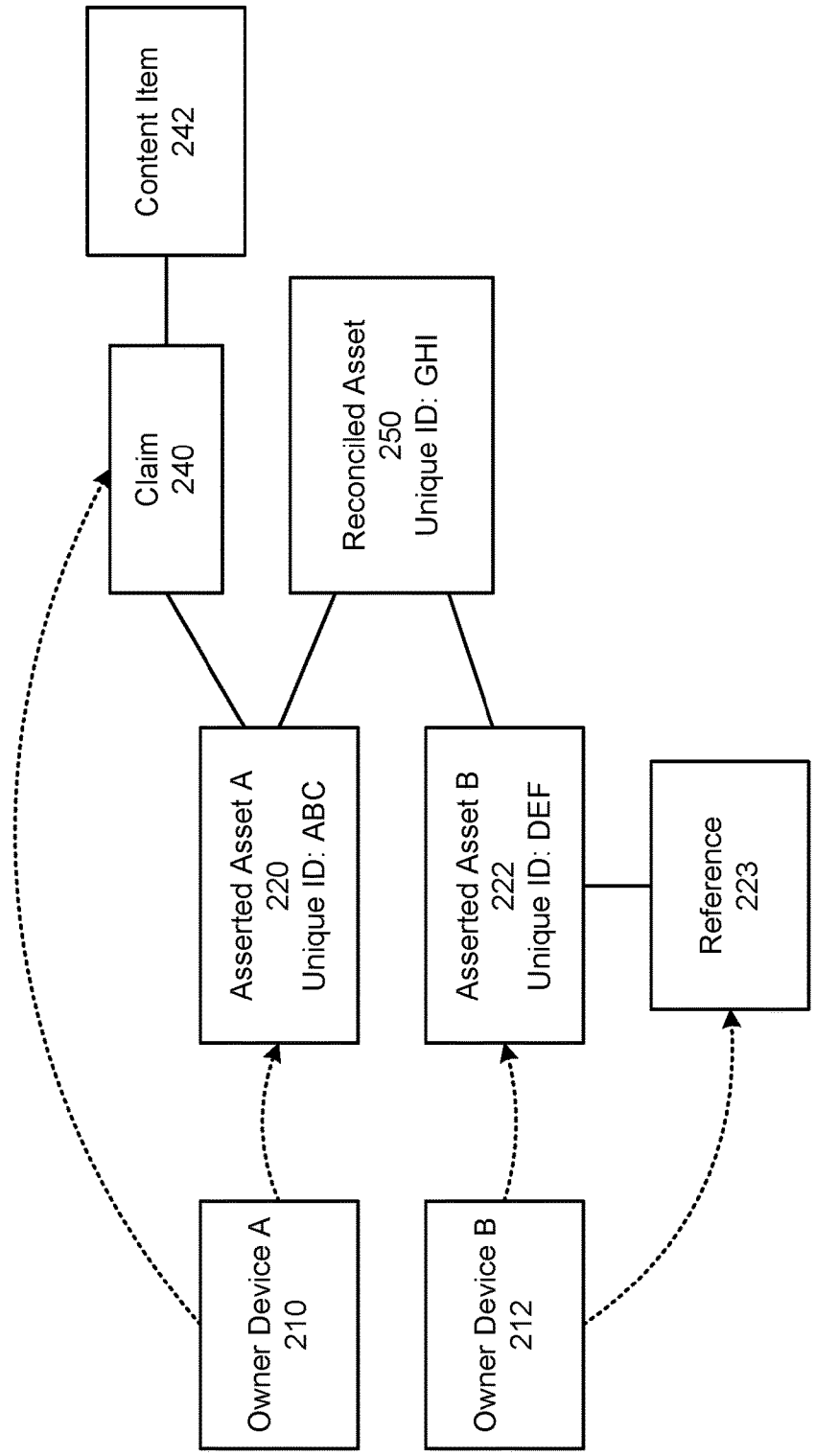
FIG. 2A illustrates an example state of owner devices, asserted assets, and reconciled assets in a rights system, according to some embodiments.
Figure 2B:
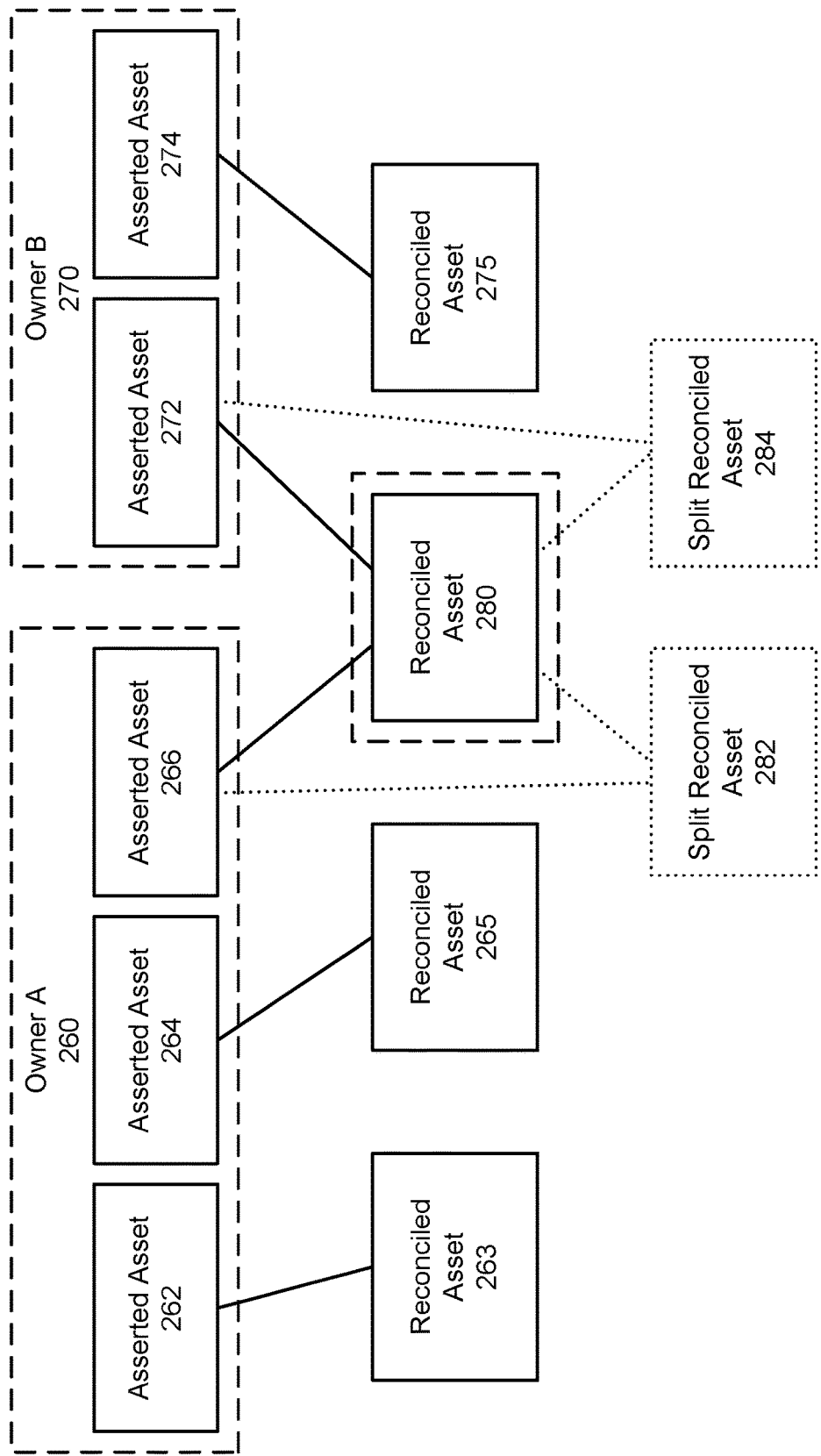
FIG. 2B illustrates example relationships between sets of asserted assets associated with different owners and a set of reconciled assets, according to some embodiments.
Figure 2C:
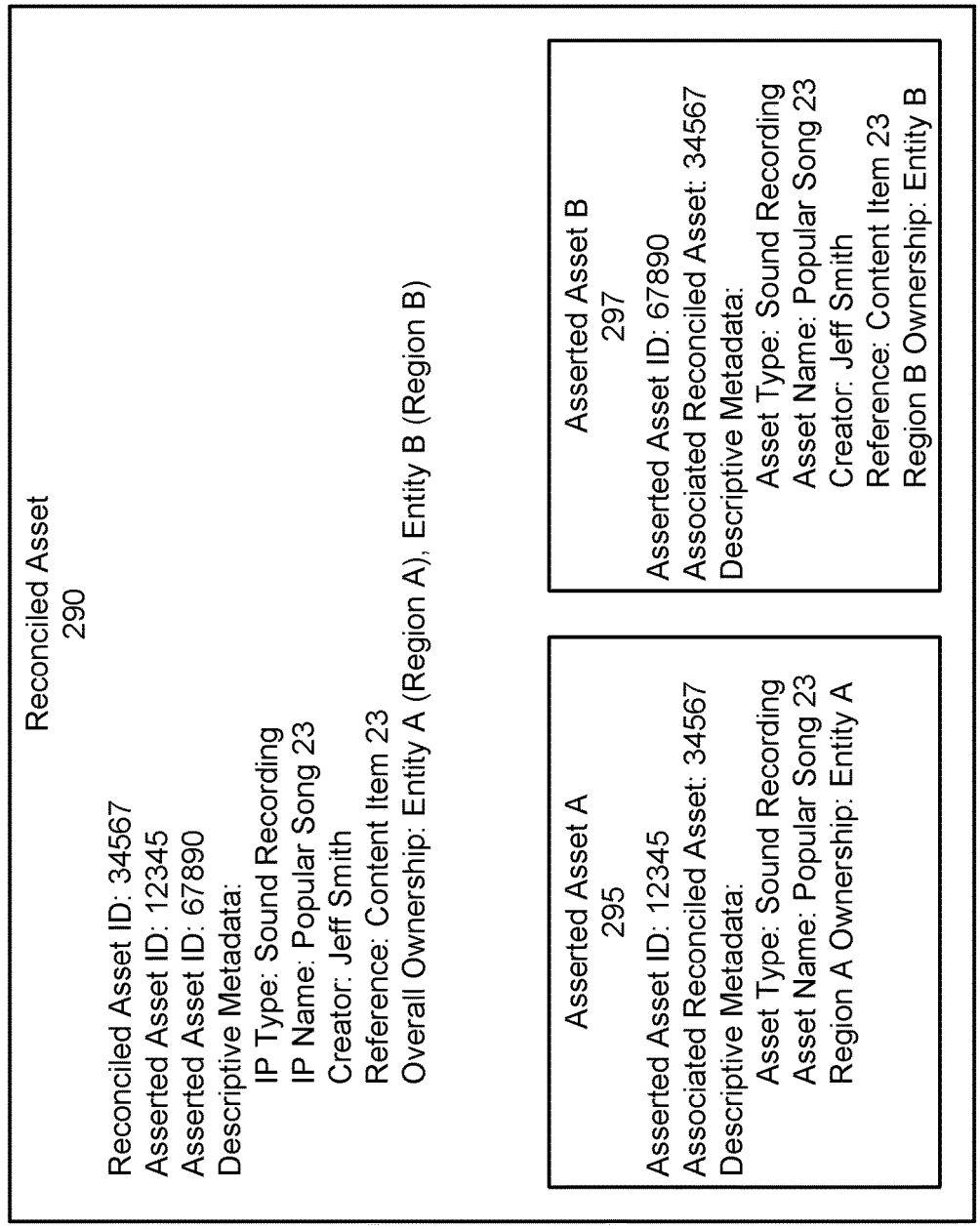
FIG. 2C illustrates an example reconciled asset and example asserted assets, according to some embodiments.

FIGS. 2A-2C illustrate example data structures and states of data structures for storing asset information in a rights system 120. Assets are stored in memory within the rights system 120 using data structures that include asserted assets and reconciled assets. An asserted asset is a data object within the rights system associating a specific asset with a specific owner. Asserted assets are associated with a unique asserted asset ID in the rights system 120 as well as an owner account of the owner associated with that asserted asset. Owner accounts themselves may be stored in a separate data object of the rights system 120 containing information about the owner.

Asserted assets are generated by the rights system 120 based on information provided by an owner via an owner device 130. The provided information identifies the owner as owning the asserted asset. The provided information generally also provides other relevant information. An asserted asset can contain any one or more of a unique ID of both the asserted asset and the associated owner (for example of an owner account), an ownership share (for example, a percentage ownership if the owner is a partial owner, or a geographic region if the owner owns rights to the asset only in a specific geographic region), and additional descriptive data describing the asset, such as a title, date of creation, and author or creator of the asset. In some implementations, descriptive data includes any data managed or contained within the asserted asset. Each asserted asset may also be associated with a reconciled asset within the rights system 120, as will be further described below. This association may be in the form of a unique reconciled asset ID and/or a pointer to the associated reconciled asset or reconciled asset ID. Asserted assets associated with the same reconciled asset may be referred to as related asserted assets.

Because an asset can be associated with multiple owners, for example assets partially owned by several owners, multiple asserted assets can exist within the rights system 120 describing the same asset from the perspective of the various owners. To clarify such fractured ownership rights, the rights system 120 pools information from multiple asserted assets describing the same asset to generate a reconciled asset. Thus, a reconciled asset is an object within the rights system 120 associating one or more asserted assets with an asset. As above, reconciled assets are associated with their own reconciled asset IDs within the rights system 120.

Reconciled assets are generated by the rights system 120 and at least reference the asserted assets associated with them, for example by asserted asset ID. Reconciled assets may also include information from those asserted assets, where the included information may vary by implementation. For example, reconciled assets can include any item of information included in or associated with an asserted asset, the underlying asset, content items associated with any of the above, and/or information from any other suitable source. In the rights system 120 the data objects representing asserted assets and reconciled asset are structured and stored in such a manner so that at any time information associated with an asserted asset or reconciled asset may be separately obtained without reference to the each other. Generally, this is because it is expected that asserted asset and reconciled asset information will change over time, and thus the two types of data objects need to be distinguishable and separable from each other so that data associated with one such object can change without necessarily negatively impacting the integrity of another object. A function of the rights system 120 is to manage these changes effectively.

Asserted assets and reconciled assets also differ in that asserted assets, including their unique IDs and other information, are known and accessible to the owners that are generating and updating them through a GUI on an owner device 130. Thus, asserted assets act as a public facing representation of an owner's ownership rights held by the systems 120 and 125. In contrast, reconciled assets are not modifiable by owners and owner devices 130 (though the reconciled assets may or may not be viewable by owners and their devices), and are the internal (system) facing representation of many owner's ownership rights held by the systems 120 and 125. Thus, as asserted assets change in response to owner provided information, the rights system 120 is configured to adjust reconciled assets to match, as best as possible, the state of ownership of assets as represented by asserted assets, and communicate conflicts in submitted information that the rights system 120 determines needs to be fixed to owner devices 130.

FIG. 2A illustrates an example state of owner devices, asserted assets, and reconciled assets in a rights system, according to some embodiments. The state 200 of FIG. 2A includes owner devices A 210 and B 212, asserted assets A 220 and B 222, a reference 223, a claim 240, a content item 242, and a reconciled asset 250. As discussed above, the owner devices can provide information to the rights system 120 and the rights system can use the received information to generate asserted assets. For example, the owner device A 210 provides information to the rights system 120 used to generate the asserted asset A 220. The asserted asset A 220 can have a unique identifier (in this case "ABC") and can contain information received from the owner device A 210 describing an asset as well as containing a link to an owner associated with the owner device A. Similarly, the owner device B 212 can provide information to the rights system 120 used to generate the asserted asset B 222. The rights system 120 can then determine that the asserted assets A 220 and B 222 describe the same asset and subsequently generate the reconciled asset 250 associated with both asserted assets A and B.

An asserted asset can be associated with one or more content items used to identify or describe the asset (hereinafter, a "reference"). References can be content items comprising the original asset, such as an uncut film, the text of a literary work, a complete copy of the original sound recording, or the like. In other situations, a reference is a content item associated with the asset, for example, in the case of a composition asset the reference copy can comprise a sound recording of a performance of the composition. References can be provided by an owner to describe an asset but references can also be determined by the rights system 120, according to some embodiments. A reference can be stored as a content item in the content system 125 or, in some implementations, can be stored separately in the rights system 120. In this case the reference 223 is provided by an owner via the owner device B 212 to describe the asserted asset B 222.

Owners can also issue claims indicating that an asset is present in a content item associated with the claim. A claim provides an association between a content item and an asset. Claims may be implemented as data objects within the rights system 120 that are associated with both a content item of the content system 125 and an asserted asset. Claims can be generated based on input from an owner of an asset. A claim generated in this manner can be associated with an asserted asset of the owner, and can link the owner to a content item of the content system 125. For example, the owner device A 210 can cause the claim 240 to be generated, where the claim 240 is a claim associating the asserted asset A 220 with the content item 242. Each content item of the content system 125 can be associated with multiple claims, and therefore multiple asserted assets. Claims can also be automatically generated by the rights system 120 or content system 125. Generally, such claims are generated in response to receipt by either system of information from a device that implicates that an existing owner has an ownership right in an asset, asserted asset, reconciled asset, or content item.

The systems 120 and 125 may provide a GUI and data structure that allows owners able to exert influence over claimed content items. For example, an owner can implement one or more policies for a claimed content item based via an owner device 130. A policy can, for example, allow the owner to control user access to the claimed content item, such as removing access to the content item on the content system, modify or alter the content item, for example to remove portions of the content item containing the owned asset, reallocate revenue of the content item, such as allowing the owner claiming a share of ad revenue associated with the claimed content item, or any other suitable action with respect to the content item. As multiple owners may be associated with the same content item through their asserted assets, the design of the policy dictates how control of the content item is split between the owners (if at all). For example, ad revenue can be split among the owners associated with the content item. Policies may be stored as separate data objects in the rights 120 and/or the content 125 system, and may be modified by owners via their devices 130 using a GUI provided by either system.

FIG. 2B illustrates example relationships between sets of asserted assets associated with different owners and a set of reconciled assets, according to some embodiments. FIG. 2B depicts asserted assets 262, 264, and 266 associated with owner A 260, asserted assets 272 and 274 associated with owner B 270, reconciled assets 263, 265, 275, and 280, and split reconciled assets 282 and 284.

In this example, the owner A 260 is associated with the asserted assets 262, 264, and 266 in the rights system 120, and the owner B 270 is similarly associated with the asserted assets 272 and 274. In some cases a reconciled asset is associated with a single asserted asset for example, the reconciled assets 263, 265, and 275 are respectively associated with the asserted assets 262, 264, and 266, respectively. However, a reconciled asset can be generated that combines information from multiple asserted assets, for example, the reconciled asset 280 is generated based on the asserted assets 266 and 272. However, reconciled asset associations are not permanent, as new information can cause reconciled asset associations to shift. In some cases, descriptive data associated with a reconciled asset is determined to be incorrect or incorrectly associated with the reconciled asset and the reconciled asset can be modified, split, deleted, or merged with another reconciled asset to reflect a change in available information. For example, new information can be received indicating that asserted assets associated with a reconciled asset do not describe the same asset such as information received from the owner A 260 differentiating the asserted asset 266 from the asserted asset 272. Therefore, based on the new information, the reconciled asset 280 can be split into the split reconciled assets 282 and 284. In some implementations, a historical record of the reconciled asset 280 is stored for later reference.

FIG. 2C illustrates an example reconciled asset and example asserted assets, according to some embodiments. FIG. 2C includes the reconciled asset 290 and asserted assets A 295 and B 297.

In the embodiment of FIG. 2C, the reconciled asset 290 is associated with the asserted assets A 295 and B 297, and contains asset information describing the asset drawn from both associated asserted assets. The reconciled asset 290 can contain both a unique reconciled asset ID identifying the reconciled asset, in this example "34567" and several asserted asset IDs identifying asserted assets associated with the reconciled asset, is this case "12345" and "67890." In some embodiments, the reconciled asset 290 contains a union of asset information in the connected asserted assets A 295 and B 297. In some implementations, a reconciled asset stores a unique identifier of the reconciled assets and a list of associated asserted assets. In these implementations, asset information associated with the reconciled asset can be retrieved form linked asserted assets. In other implementations, a reconciled asset can store a full or partial set of the information contained in associated asserted assets. For example, the reconciled asset can cache frequently accessed information, such as overall ownership information comprising a union of the ownership information of the associated asserted assets or, as in the embodiment of FIG. 2C, a reconciled asset can store a union of the descriptive data of associated asserted assets.

An asserted asset, such as the asserted asset A 295, can contain an unique asserted asset ID, in the example of the asserted asset A 295, "12345." As described above, an asserted asset can contain an identification of both the asset and owner, an ownership share or conditions, and asset information identifying the asset. Asset information can comprise a title, date of creation, and author or creator of the work as well as more detailed information identifying the asset, such as a copyright registration number, ISBN number, digital fingerprint, or the like. It may also include (directly or by reference) a "reference" copy of the asset. For example, the asserted asset B contains a reference to "content item 23." The asserted assets A 295 and B297 are asserted assets associated with the same reconciled asset.

III. Rights System

Figure 3:
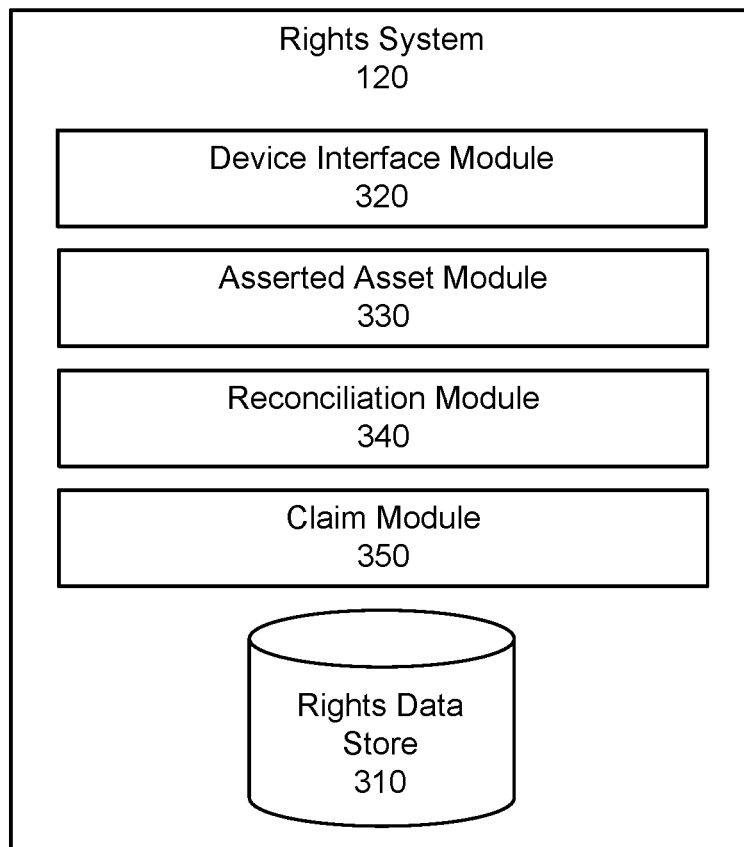
FIG. 3 is a block diagram illustrating an example rights system, according to some embodiments.

FIG. 3 is a block diagram illustrating an example component structure for a rights system, according to one embodiment. The rights system 120 of FIG. 3 includes a rights data store 310, device interface module 320, asserted asset module 330, reconciliation module 340, and claim module 350.

The rights data store 310 store claims, asserted assets, and reconciled assets for access by the rights system 120. The rights data store 310 can also store historical data about historical claims or reconciled assets for later reference by the rights system 120. Claims, asserted assets, and reconciled assets can be stored within the rights data store 310 by any suitable method, for example, a table, list, or database. As an example, the rights data store 310 may include one or more tables storing asserted and reconciled assets. Each asserted asset can be stored in a row of the table, where the row contains data from the owner associated with that asserted asset, for example, descriptive data. The asserted asset row also contains an ID of an associated reconciled asset and/or pointer to a reconciled asset row of the same or a different table. For example, an asserted asset row for a song asset can contain entries for the title, artist, genre, and associated album of the song, as well as a pointer to a reference .mp3 file of the song provided by the owner, as well as an identifier for the associated owner, entries for ownership share and ownership region, and a pointer to an associated reconciled asset.

A reconciled asset row can contain descriptive data from associated asserted assets, as well as pointers to associated asserted assets. For example, a reconciled asset row can contain a union of the descriptive data of associated asserted assets. Alternatively, a reconciled asset row may instead contain a subset of the descriptive data of associated asserted assets. A reconciled asset row can further contain IDs of associated asserted assets, a copy of calculated states of the reconciled asset, a version number for or other indication of the algorithm used to calculate the reconciled asset, and any other associated data. A reconciled asset row can contain reconciled asset IDs that can be used to refer to that reconciled asset, including a "canonical" reconciled asset ID used to refer to the reconciled asset by the rights system 120.

The device interface module 320 allow the rights system 120 to communicate with owner devices 130 and vice versa. Specifically, the device interface module 320 receives information describing asserted assets or claims from owner devices 130. Similarly, the device interface module 320 transmit information about potential claims to one or more owner devices 130. The device interface module 320 can receive and transmit information to owner devices 130 by any suitable method, such as through a website, through a dedicated software application, through email, or through any other suitable inter-device communication method.

The device interface module 320 also provides a graphical user interface accessible to owners, for example through an owner device 130, that allows an owner to view, update, or add to information about their associated asserted assets contained within the rights system 120. Similarly, the GUI allows owners to submit claims and displays rights system 120 suggested claims to owners. Generally, an owner is only able to access or modify information provided by that owner, however this is not strictly necessary. An owner interacts with individual asserted assets through the GUI on the owner device 130. One or both of the owner and GUI uses the asserted asset IDs as a means for transacting with the right system 120 regarding information to be added, updated, deleted, claims to be made, etc. The rights system 120 can be configured so that even if the reconciled asset associated with an asserted asset is modified, split, merged, or changed, the asserted asset ID remains consistent, and the changes in the reconciled asset do not affect the owner's interaction with their associated asserted asset.

The asserted asset module 330 creates, accesses, updates, and deletes asserted assets based on information received from owner devices 130. Specifically, the asserted asset module 330 is instructed to generate an asserted asset based on an instruction from an owner device 130 associated with an owner. The asserted asset module 330 subsequently generates the asserted asset based on ownership information and other information describing an asset provided as part of the instruction. Similarly, the asserted asset module 330 modifies asserted assets based on new or revised information received from owners. The asserted asset module 320 is further configured to read asserted assets from the rights data store 310 in response to a variety of queries, for example in response to an asserted asset update request, a viewing request from the device interface module 320 to present information to a client, and in response to claim requests provided by the claim module 350 or by an owner device 130. The asserted asset module 320 is further configured to delete asserted assets upon request from an owner device 130.

The reconciliation module 340 creates, accesses, updates, and deletes reconciled assets based on asserted assets stored in the rights system 120. As reconciled assets are generated based commonly occurring information between different asserted assets, often changes to reconciled assets (including addition of new reconciled assets and deletion of un-needed reconciled assets) occurs based on changes to asserted assets (including creation and deletion of asserted assets). Generally, the reconciliation module 340 is capable of updating reconciled assets in real time (for example, directly in response to instructions received from owner devices 130 regarding asserted assets), however in practice updates to reconciled assets may also be performed asynchronously (e.g., offline relative to) a change in an asserted asset.

The reconciliation module 340 associates newly created asserted assets with new or existing reconciled assets. The reconciliation module 340 accomplishes this by comparing the data associated with a new asserted asset to the set of existing reconciled assets to determine a corresponding reconciled asset. Reconciliation module 340 determines correspondence based on one or more of 1) presence and degree of overlap data in the set of descriptive data associated with candidate asserted assets considered for association (and may also consider information directly contained within the reconciled asset), and 2) lack of or degree of conflict in the set of descriptive data associated with the candidate asserted assets (and again may also consider information directly contained within the reconciled asset).

The exact method to determine whether correspondence exists may vary by implementation, however generally the more overlap in the descriptive data of the two sets and the less conflict between the descriptive data of the two sets, the more likely a new asserted asset is to correspond to an existing reconciled asset. As a specific example, module 340 may rank reconciled assets based on a degree of correspondence based on a function of 1) and 2) above, and identify a highest ranked reconciled asset as the corresponding reconciled asset. Additionally or alternatively, module 340 may set a minimum threshold level of correspondence based on a function of 1) and 2) above for a reconciled asset to be identified as the corresponding reconciled asset.

If the reconciliation module 340 identifies a corresponding reconciled asset, module 340 associates the asserted asset with the corresponding reconciled asset. If no corresponding reconciled asset is found, the reconciliation module 340 may either leave the new asserted asset unaffiliated with any reconciled asset, or may create a new reconciled asset to associate with the new asserted asset.

New asserted assets or changes in existing asserted assets, however, may introduce conflicts between existing asserted assets all associated with the same reconciled asset. Thus, when a given asserted asset is updated, the reconciliation module 340 compares descriptive data of the related asserted assets to determine if any conflicts in the data have been introduced with the modification of the asserted asset. Generally, the reconciliation module 340 determines that a conflict exists when descriptive data of two asserted assets associated with a reconciled asset does not agree with each other.

For example, related asserted assets representing different printings of a particular text (example asset) may be represented in the rights data store 310 by a single reconciled asset. The asserted assets may be in conflict if ISBN numbers associated with the asserted assets do not agree (e.g., are changed by one owner so as to no longer agree). Such a conflict may now represent a conundrum, as some descriptive data for these asserted assets may indicate that these asserted assets are associated with the same book. However, now a piece of information submitted by an owner indicates that the asserted assets are, according to the submitted owner, not related to the same book. Thus, one or more owners has made a mistake, possibly intentional and possibly innocently, either with respect ISBN number or some other item of descriptive data. Further, from the point of view of the rights system 120, the rights system 120 does not objectively know which information is correct and which is incorrect, and is instead reliant on receiving information regarding asserted assets from the owner devices 130.

The reconciliation module 340 can handle such conflicts by merging or splitting (including creating and deleting) reconciled assets as appropriate to fit the known information about the asserted assets. The reconciliation module 340 automatically takes appropriate action to resolve the conflict. The type of action taken may vary based on the severity of the conflict in information.

For minor typographical conflicts, such as in asset titles, authors, and other descriptive data, the reconciliation module 340 may not change the associations between asserted assets and reconciled assets. This is particularly the case if the typographical errors are easily identifiable. Various techniques may be used to identify such common errors, often attributable to incorrect data entry. Examples of such techniques may include automated techniques such as machine learning, as well as identification of whether or not the error results the reconciliation module 340 suggesting a split of the asserted assets among multiple reconciled assets. For example, if a misspelling of a musician name turns up no other plausible musicians who have created such an asset (and other available information does not suggest that it may in fact be a different piece of music or musician altogether), then the reconciliation module 340 may conclude that no split is necessary and identify that the error is typographical. In such instances, the rights system 120 may send a notification to one or more owners via the GUI of the owner devices 130 to request correction of these types of errors.

For more significant conflicts, the reconciliation module 340 splits and merges reconciled assets, circumstances depending. Splitting a reconciled asset can occur when related asserted assets have significant conflicts, such as when reference files provided for multiple asserted assets do not match. Similarly, a reconciled asset can be split when a new asserted asset is identified as corresponding to the reconciled asset, for example based on descriptive data overlapping with a subset of asserted assets associated with the reconciled asset, but where the new asserted asset also conflicts with or does not substantially overlap with another subset of the asserted assets associated with the reconciled asset. The exact qualifications for what kind of data conflict triggers in a split (and/or a merge with another reconciled asset) depends upon the implementation.

Given a significant data conflict that triggers a split, generally the reconciliation module 340 groups asserted assets to avoid conflict within a group while increasing the overlap of descriptive data within each group. Various clustering algorithms may be implemented to accomplish this tasks. For a specific example, the reconciliation module 340 can first separate each asserted asset that conflicts with another asserted asset to a separate group. Then, the reconciliation module 340 can compare each ungrouped asserted asset to each of the groups and assign the ungrouped asserted asset to the group with which it has the greatest overlap of descriptive data. Once all the asserted assets are assigned to a group, the reconciliation module 340 can generate new reconciled assets (with new reconciled asset IDs) or assign existing reconciled assets for each group of the asserted assets. Because the data regarding asserted assets and reconciled assets are maintained as distinct in the rights system 120, splitting a reconciled asset does not create confusion about which descriptive data should be associated with each split reconciled asset.

Merging reconciled assets can occur at any point in time. Often merging will occur when a new asserted asset is identified to correspond to multiple reconciled assets. Merging reconciled assets can also occur when several reconciled assets are found to correspond to each other. For example, references of multiple asserted assets can be found to closely correspond, indicating that the reconciled assets associated with each of the multiple asserted assets also correspond.

Similar to splitting a reconciled asset, the exact method of merging reconciled assets can vary based on the exact implementation, however in large part, the greater overlap in the descriptive data between the reconciled assets to be merged and the less conflict between the reconciled assets, the higher the likelihood the reconciled assets will be merged. For example, the reconciliation module 340 can identify multiple reconciled assets with a very high degree of correspondence by analyzing and comparing their respective descriptive data. In some implementations, the reconciliation module 340 determines a degree of correspondence between the reconciled assets to be merged. Based on the degree of correspondence being higher than a minimum threshold level of correspondence, the reconciled assets can be merged. A new merged reconciled asset (with a new reconciled asset ID) can be generated, and the asserted assets associated with the old reconciled assets can be re-associated with the merged reconciled asset.

After a reconciled asset is merged or split, the reconciliation module 340 updates associated asserted assets to reference the newly created or assigned reconciled asset, for example by inserting the appropriate reconciled asset ID into each of the asserted assets. Because asserted assets and reconciled assets are distinct in the rights system 120, an asserted asset can remain unchanged (other than an updated association with a reconciled asset) and maintain a consistent asserted asset ID even through the corresponding reconciled asset has been merged, split, or otherwise altered. In some embodiments, a historical copy of the pre merge/split reconciled asset(s) can be maintained in the rights system 120 for archival purposes. The rights system 120 can use these historical copies to determine the state of the rights system's model of content ownership for data gathering, or other suitable purposes requiring historical knowledge of the IP model. In some embodiments, owners may request information using a the ID of a historical reconciled asset, such as a reconciled asset ID of a pre merge/split reconciled asset that has since been merged/split. In some embodiments reconciled assets can include the reconciled asset IDs of historical reconciled assets that forward to that reconciled asset. For example, a new reconciled asset is generated as a result of the merge of several previous reconciled assets. The new reconciled asset can contain the reconciled asset IDs of the previous reconciled assets, and references to any of the previous reconciled assets will return the data of the new reconciled asset. When a reconciled asset is split, one of the newly generated split reconciled assets can be associated with the previous reconciled asset IDs of the pre-split reconciled asset. However, even though a reconciled asset can be associated with multiple reconciled asset IDs, for example through merging and splitting, each reconciled asset is associated with one "canonical" reconciled asset ID used to refer to that reconciled asset within the rights system 120. Examples of merging and splitting are further described below in sections VI-VIII.

The claim module 350 generates and handles claims associated with content items. The claim module 350 receive claims from owner devices 130. One category of claims identify that an asserted asset is contained in a specific content item. Generally such claims are for the purpose of making the rights system 120 and/or content system 125 aware of the inclusion, so that the rights system 120 and/or content system 125 can store information about the inclusion and apply the appropriate policies to that content item.

The claim module 350 itself may also create claims of this category based on updates to asserted assets, which will often implicate an update in ownership of a particular content item. In these instances, the claim module 350 sends communications to owner devices 130 associated with the affected asserted assets to obtain information about how to handle content items including an owner's asserted assets. In some implementations, the claim module 350 can suggest potential claims to owners based on information known to the rights system 120. For example, the claim module 350 can employ automated matching methods to select content items likely to contain an asserted asset based on comparing each content item with a reference associated with the asserted asset. An owner can be considered to have "claimed" a content item when a claim object is generated associating the content item with an asserted asset associated with the owner. Once a matching content item is found, the rights system 120 can notify the owner associated with the asserted asset to suggest a claim. In other implementations, a claim can be directly generated by the rights system 120 based on the match. Similarly, the claim module 350 can suggest claims to owners based on existing claims associated with related asserted assets. For example, claims can be suggested to an owner of a first asserted asset based on existing claims associated with a related asserted asset. As asserted assets associated with the same reconciled asset are determined by the system to likely describe the same asset (the asset described by the reconciled asset), claims associated with one asserted asset associated with a specific reconciled asset likely apply to all asserted assets associated with the reconciled asset. Therefore, the claim module 350 can suggest a claim on the same content item to owners associated with each of the other related asserted assets. In some embodiments, the claim module 350 suggest claims to related asserted assets responsive to receiving a new claim from an owner. The claim module 350 can also use suggested claims to resolve information conflicts present in the rights system 120. For example, a suggested claim can request an owner to provide additional descriptive data associated with an asserted asset of that owner.

IV. Asset Generation

Figure 4:
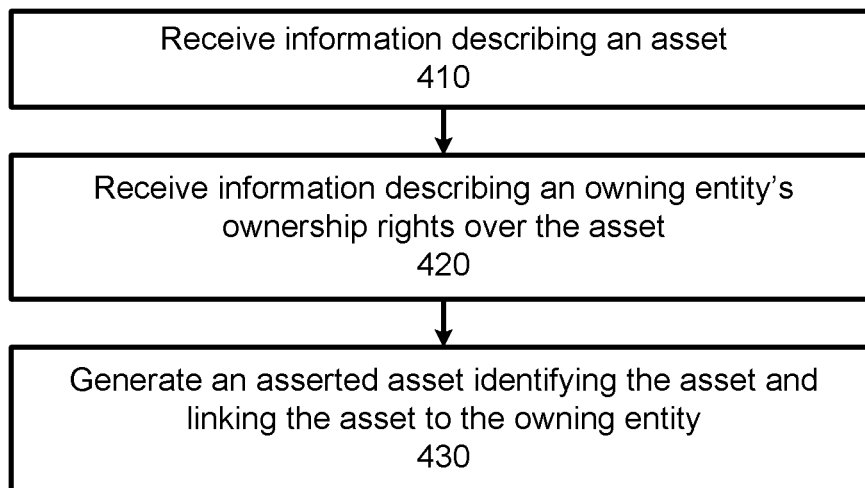
FIG. 4 is a flowchart describing an example process for generating an asserted asset, according to some embodiments.

FIG. 4 is a flowchart describing an example process for generating an asserted asset, according to one embodiment. The process 400 includes receiving information describing an asset 410 at the rights system 120. The information can be received from an owner device 130 associated with an owner. The rights system 120 receives further information is received 420 describing an owning entity's (e.g. an owner) ownership rights over the asset. For example, the received information describes an ownership share or region in which an owner has rights to an asset. Then, the rights system 120 generates 430 an asserted asset identifying the asset and linking the asset to the owning entity.

Figure 5:
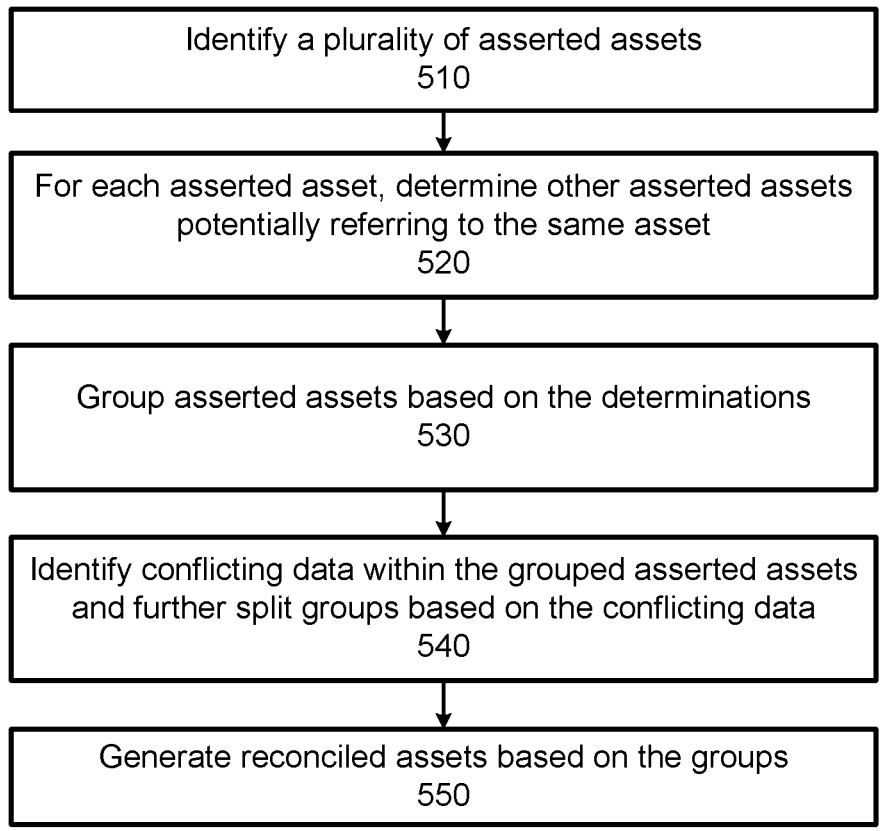
FIG. 5 is a flowchart describing an example process for generating reconciled assets based on asserted assets, according to some embodiments.

FIG. 5 is a flowchart describing an example process for generating reconciled assets based on asserted assets, according to one embodiment. The process 500 includes identification 510 of a plurality of asserted assets in the rights system 120. For each asserted asset, the rights system 120 determines other asserted assets which potentially refer to the same asset. The asserted assets can then be split 530 into groups by the rights system 120 based on the determination. Conflicts in the grouped asserted assets can then be identified 540 and the asserted assets can be re-grouped and associated with a different set of reconciled assets to reduce conflicts. As part of this, new reconciled assets can be generated 550.

V. Asset Updating

Figure 6:
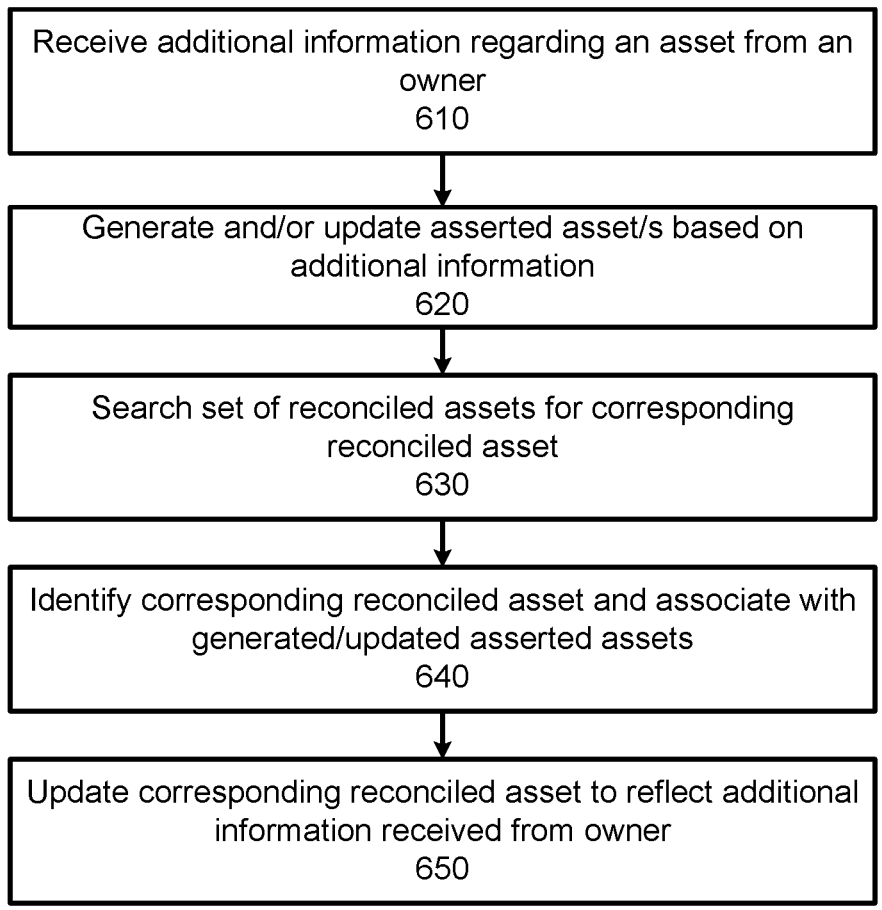
FIG. 6 is a flowchart describing an example process for updating reconciled assets based on additional information, according to some embodiments.

FIG. 6 is a flowchart describing an example process for updating reconciled assets based on additional information, according to one embodiment. The process 600 includes receiving additional information about an asset 610 at the rights system from an owner. The rights system 120 generates or updates 620 asserted assets based on the received additional information, and the set of reconciled assets in the rights system can be searched 630 for the reconciled asset corresponding to the generated asserted asset. Once the corresponding reconciled asset is identified 640, the rights system 120 can associate the generated/updated asserted assets and the reconciled asset within the rights system. Then, the rights system 120 can update 650 the corresponding reconciled asset to reflect the additional information received from the owner, and later used to generate the asserted asset. This may include, for example, incorporating asset information of the generated asserted asset into the reconciled asset. A similar process can be undertaken when an asserted asset is updated or modified by an associated owner device 130, as long as the modification does not introduce significant conflicts with the corresponding reconciled asset as introduced above.

Figure 7A:
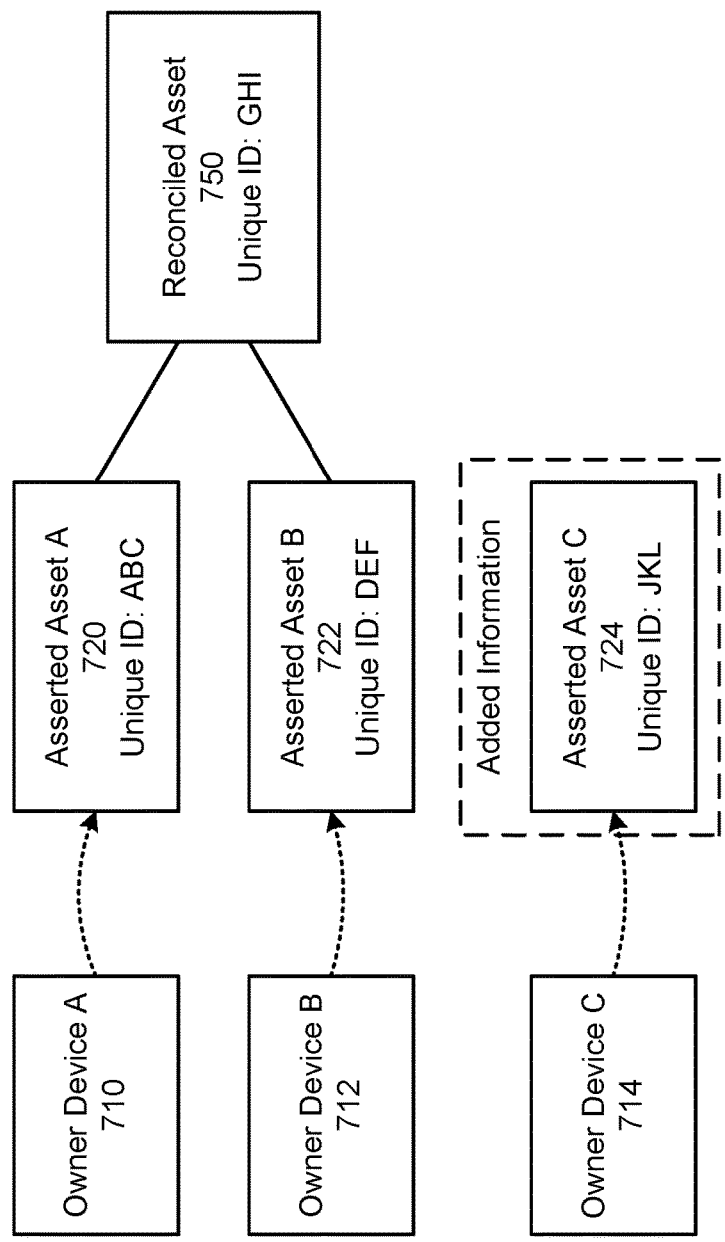
FIG. 7A illustrates an example state of owner devices, asserted assets, and reconciled assets in a rights system including an additional asserted asset, according to some embodiments.

FIG. 7A illustrates an example state of owner devices, asserted assets, and reconciled assets in a rights system including additional asserted asset information, according to one embodiment. For the purposes of the example, state 700 represents a state after step 620 of the process 600. The state 700 of FIG. 7A includes owner devices A 710, B 712, and C 714, asserted assets A 720, B 722, and C 724, and a reconciled asset 750.

Similar to the state 200 of FIG. 2A, the state 700 depicts a situation in which the owner devices A 710 and B 712 provide information to the rights system 120 used to generate the asserted asset A 720 and B 722. The rights system 120 has previously in time determined that the asserted assets A 720 and B 722 describe the same asset and has subsequently generated the reconciled asset 750 associated with both asserted assets A and B. In the example of FIG. 7A, a third owner device, the owner device C 714, has recently provided additional information used to generate the asserted asset C, which is not yet associated with a reconciled asset.

Figure 7B:
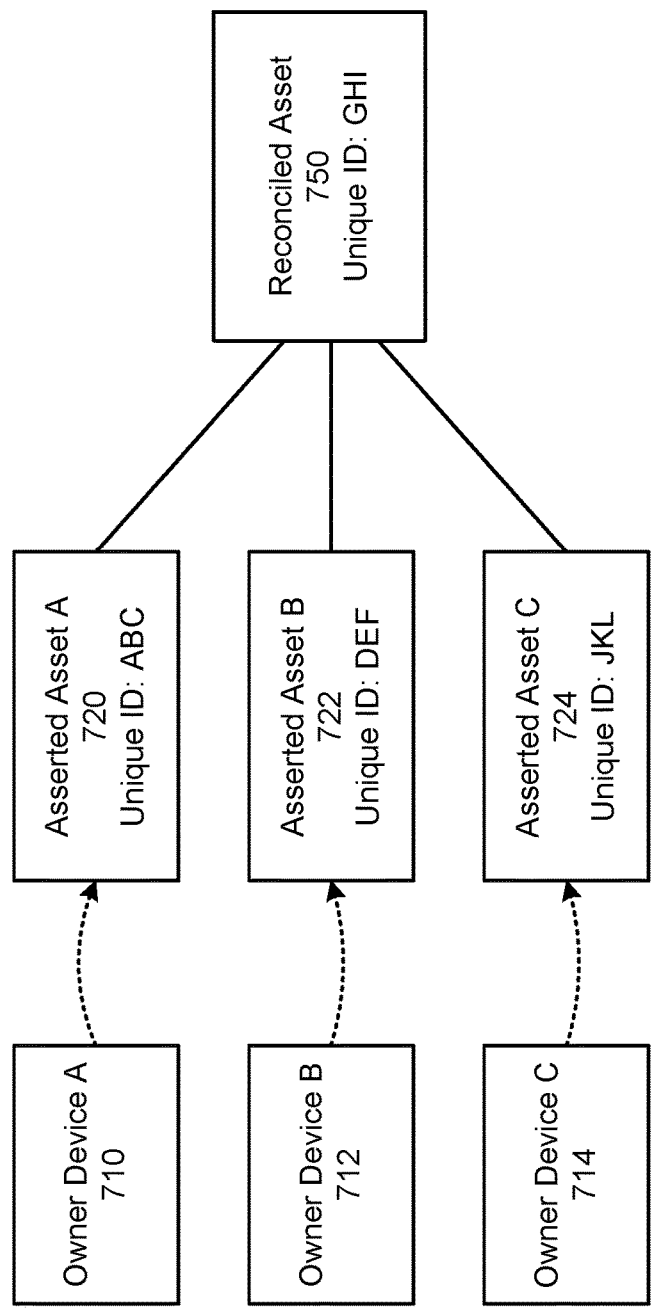
FIG. 7B illustrates a second example state of owner devices, asserted assets, and reconciled assets in a rights system where the additional asserted is clustered into an existing reconciled asset, according to some embodiments.

FIG. 7B illustrates a second example state of owner devices, asserted assets, and reconciled assets in a rights system where the additional asserted asset information is used to associate asserted asset C 724 with an existing reconciled asset 750, according to one embodiment. For example, this association can be made based on descriptive data of the asserted asset C 724 overlapping with descriptive data of the reconciled asset 750. The state 701 of FIG. 7B can represent a state after the completion of the process 600 of FIG. 6 and can represent a state later in time than the state 700 of FIG. 7A. The state 701 of FIG. 7B includes owner devices A 710, B 712, and C 714, asserted assets A 720, B 722, and C 724, and a reconciled asset 750.

After the completion of the process 600, the asserted asset C 724 has been associated with the reconciled asset 750 based on a determination that the asset of the asserted asset C 724 corresponds to the existing reconciled asset 750, as described in section III describing the reconciliation module 340 above. In this example, no significant conflicts were introduced by the addition of the descriptive data of asserted asset C 724, and consequently the rights system 120 simply updates the reconciled asset 750 to reflect the addition of the asserted asset C 724. The claims module 350 may use the creation of the association between asserted asset C and reconciled asset 750 to suggest possible claims to owner device C 714 based on this association, for example the claim 740 associated with the content item 742.

VI. Asset Splitting

Figure 8:
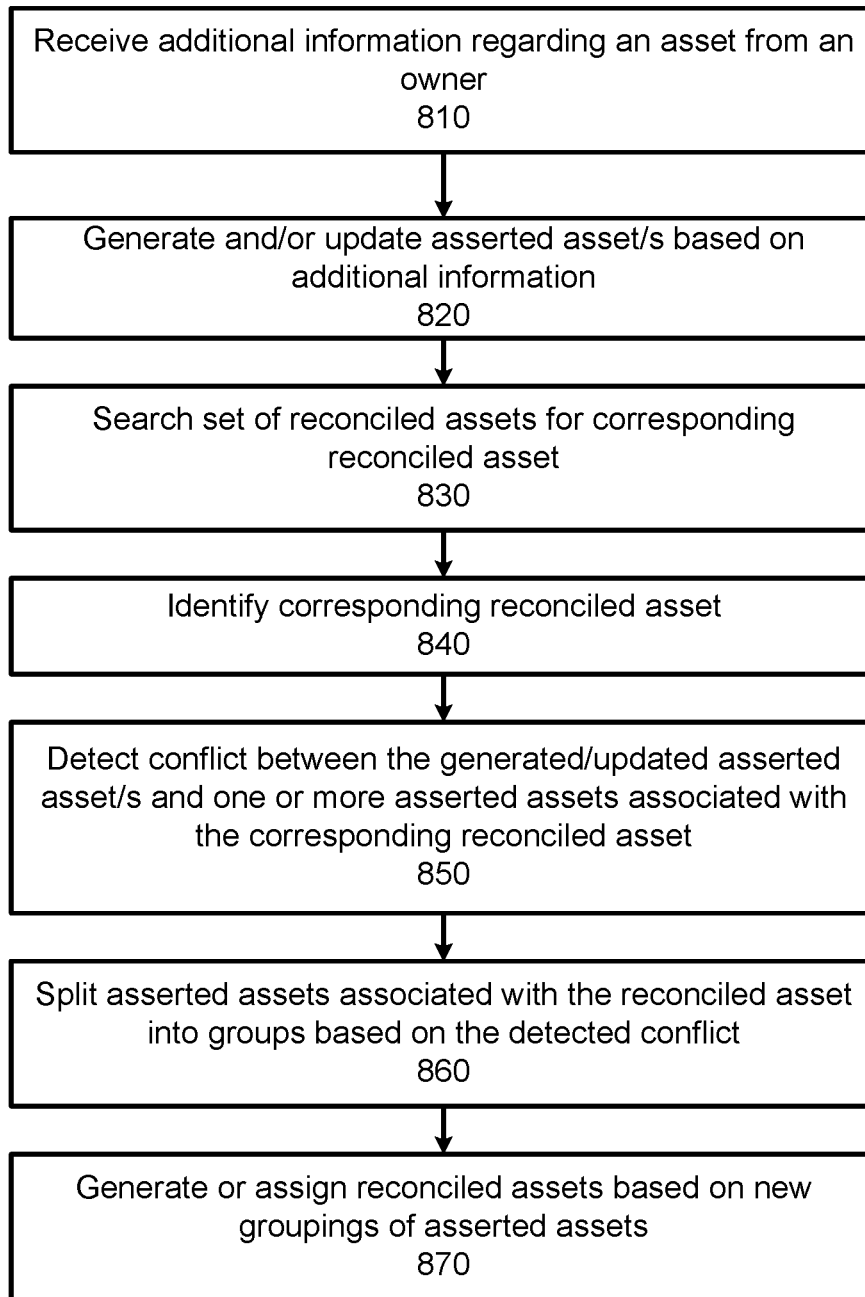
FIG. 8 is a flowchart describing an example process for splitting reconciled assets based on additional information, according to some embodiments.

FIG. 8 is a flowchart describing an example process for splitting reconciled assets based on additional information, according to one embodiment. Similar to the process 600, in process 800 the rights system 120 receives additional information, for example about an asset, from an owner via an owner device 140. An asserted asset is generated or updated 820 based on the received additional information, for example based on descriptive data identifying an asset. The rights system 120 then searches 830 the set of reconciled assets in the rights system for the reconciled asset corresponding to the generated asserted asset and identifies 840 the corresponding reconciled asset.

After the corresponding reconciled asset is identified, the rights system 120 can detect 850 a conflict between one or more of the asserted assets associated with the corresponding reconciled asset and the generated/updated asserted asset. Based on the detected conflict, the rights system 120 splits 860 the asserted assets associated with the corresponding reconciled asset (including the generated asserted asset) into groups. For example, the rights system 120 can split the asserted assets into groups with no internal conflicts. Finally, the rights system 120 generates or assigns 870 reconciled assets based on the groups of asserted assets, and the asserted assets can be subsequently associated with the split reconciled assets as appropriate. In some implementations, a similar process can be undertaken when an asserted asset is updated or modified by an associated owner device 130 and the modification introduces conflicts with the corresponding reconciled asset.

Figure 9A:
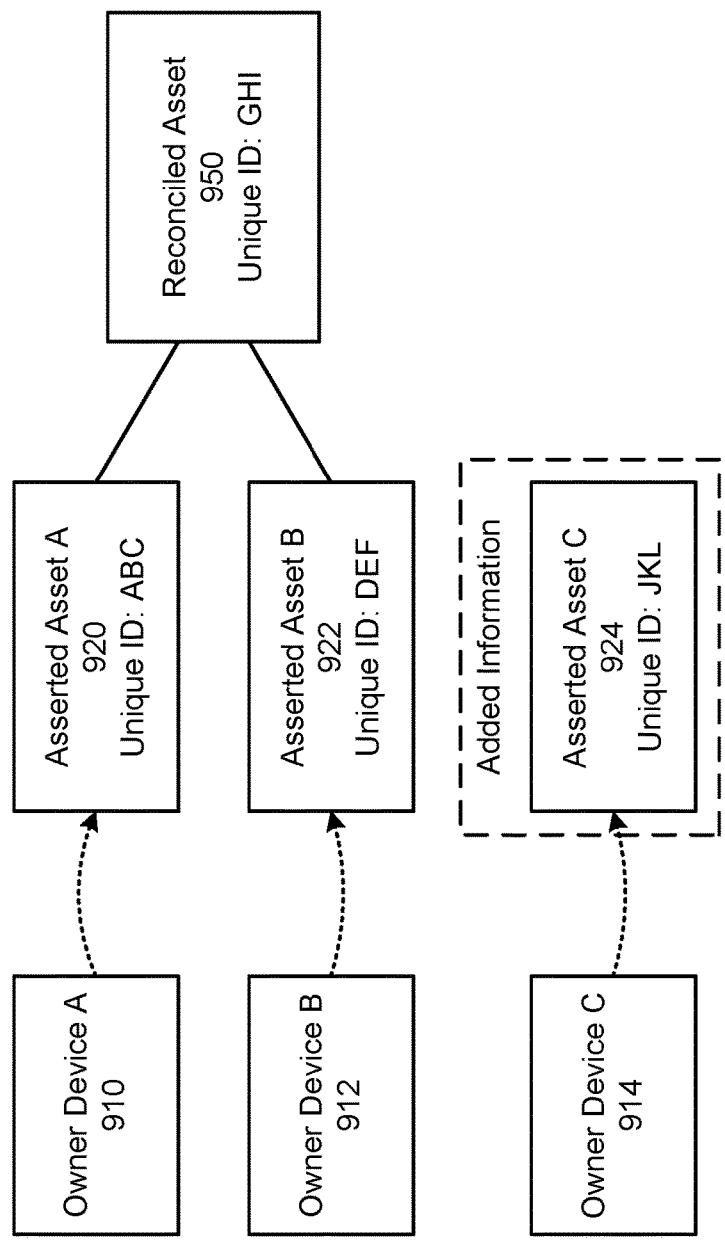
FIG. 9A illustrates an example state of owner devices, asserted assets, and reconciled assets in a rights system including an additional asserted asset, according to some embodiments.

FIG. 9A illustrates an example state of owner devices, asserted assets, and reconciled assets in a rights system including an additional asserted asset, according one embodiment. For the purposes of example, the state 900 represents a state after step 820 of the process 800. The state 900 of FIG. 9A includes owner devices A 910, B 912, and C 914, asserted assets A 920, B 922, and C 924, and a reconciled asset 950.

The state 900 depicts a situation similar to that of the state 700 in which the owner devices A 910 and B 912 provide information to the rights system 120 used to generate the asserted asset A 920 and B 922. The rights system 120 has determined that the asserted assets A 920 and B 922 describe the same asset and has subsequently generated the reconciled asset 950 associated with both asserted assets A and B. In the example of FIG. 9A, a third owner device, the owner device C 914, has recently provided additional information used to generate the asserted asset C, which is not yet associated with a reconciled asset.

Figure 9B:
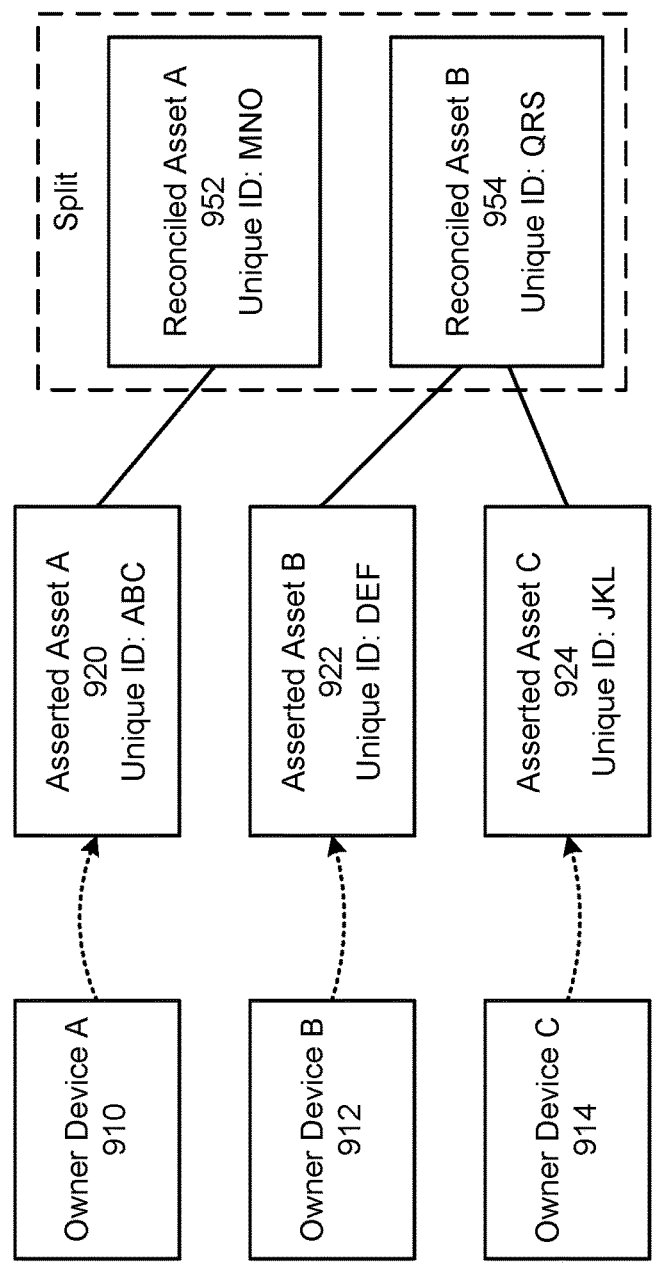
FIG. 9B illustrates a second example state of owner devices, asserted assets, and reconciled assets in a rights system where the additional asserted asset causes an existing reconciled asset to be split, according to some embodiments.

FIG. 9B illustrates a second example state of owner devices, asserted assets, and reconciled assets in a rights system where the additional information provided by the third owner through owner device C 914 (resulting in the creation of an additional asserted asset) causes an existing reconciled asset to be split, according to one embodiment. For example, the state 901 of FIG. 9B can represent a state after the completion of the process 800 of FIG. 8. The state 901 of FIG. 9B includes owner devices A 910, B 912, and C 914, asserted assets A 920, B 922, and C 924, and split reconciled assets 952 and 954.

After the process 800 has completed, the reconciled asset 950 has been split into the split reconciled assets 952 and 954, each associated with a subset of the asserted assets previously associated with the reconciled asset 950. Because a significant conflict was introduced when the asserted asset C 924 was associated with the reconciled asset 950, the associated asserted assets A 920, B 922, and C 924 were split in a way that does not generate conflicts and associated with the split reconciled assets A 952 and B 954. As discussed above in section III, the reconciliation module 340 may store a historical copy of the reconciled asset 950 can be stored for archival purposes. Because the claim 940 is associated with the asserted asset A 920 and not the reconciled asset A 952, there is no ambiguity when the reconciled asset 950 is split.

VII. Asset Merging

Figure 10:
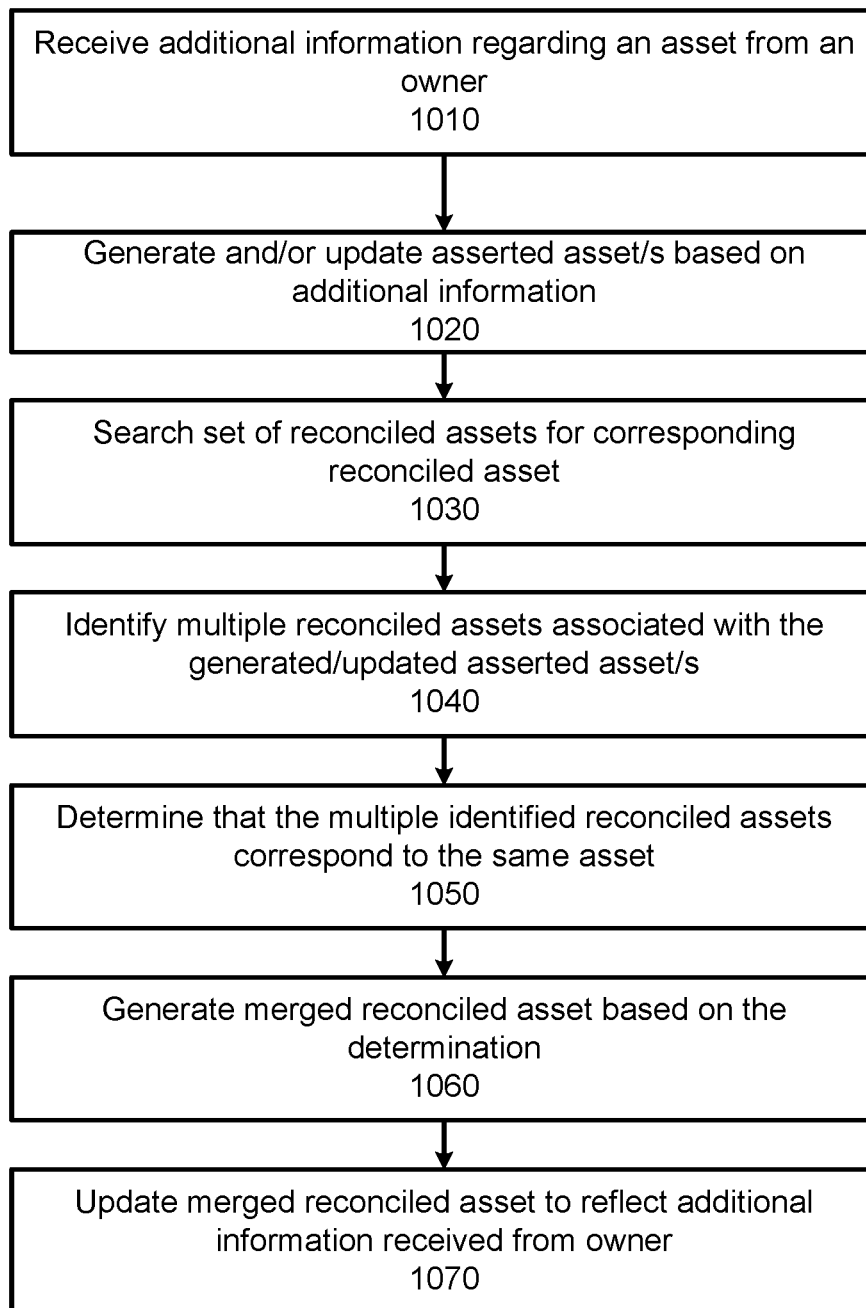
FIG. 10 is a flowchart describing an example process for merging reconciled assets based on additional information, according to some embodiments.

FIG. 10 is a flowchart describing an example process for merging reconciled assets based on additional information, according to one embodiment. Similar to the process 600, in the process 1000 the rights system 120 receives 1010 additional information, for example about an asset, from an owner via an owner device 140. An asserted asset is generated or updated 1020 based on the received additional information and the set of reconciled assets in the rights system is searched 1030 for the reconciled asset corresponding to the generated/updated asserted asset. However, when the set of reconciled asset is searched, the rights system 120 identifies 1040 multiple reconciled assets corresponding to the generated/updated asserted asset. Based on the identification, the rights system 120 can determine 1050 that the multiple identified reconciled assets correspond to the same asset. For example, the rights system 120 can compare descriptive data associated with the multiple identified rights systems to determine that the multiple identified reconciled assets correspond to the same asset.

The rights system 120 can then generate 1060 a merged reconciled asset based on the determination. For example, the merged reconciled asset can be associated with the asserted assets previously associated with each of the multiple identified reconciled assets. The rights system 120 can then update 1070 the merged reconciled asset to reflect the additional information received from the owner. In some implementations, a similar process can be undertaken when an asserted asset is updated or modified by an associated owner device 130 and the modification introduces conflicts with the corresponding reconciled asset.

Figure 11A:
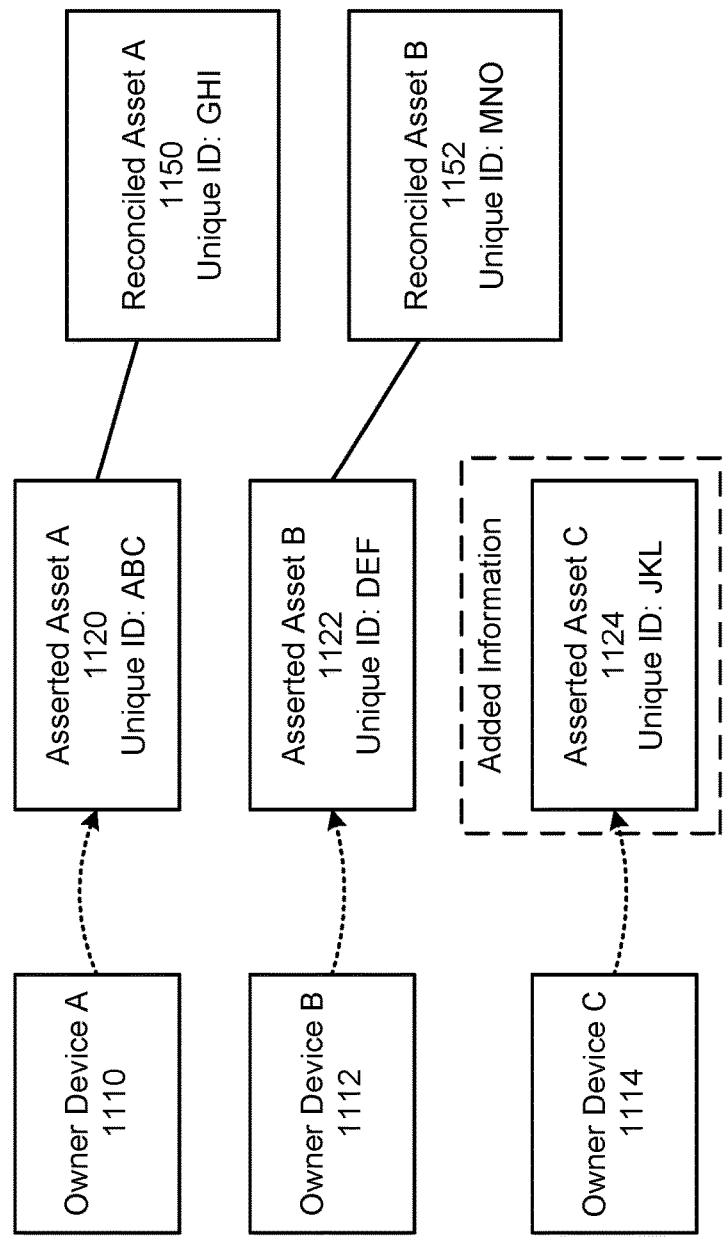
FIG. 11A illustrates an example state of owner devices, asserted assets, and reconciled assets in a rights system including an additional asserted asset, according to some embodiments.

FIG. 11A illustrates an example state of owner devices, asserted assets, and reconciled assets in a rights system including additional asserted asset information, according to one embodiment. For the purposes of example, state 1100 represents a state after step 1020 of the process 1000. The state 1100 of FIG. 9A includes owner devices A 1110, B 1112, and C 1114, asserted assets A 1120, B 1122, and C 1124, and reconciled assets 1150 and 1152.

The state 1100 depicts a situation similar to that of the state 700 in which the owner devices A 1110 and B 1112 provide information to the rights system 120 used to generate the asserted asset A 1120 and B 1122. The rights system 120 has previously in time determined that the asserted assets A 1120 and B 1122 do not describe the same asset and has subsequently generated the reconciled assets 1150 and 1152 associated with the asserted assets A and B, respectively. In the example of FIG. 11A, a third owner device, a third owner device, the owner device C 1114, has recently provided additional information used to generate the asserted asset C, which is not yet associated with a reconciled asset.

Figure 11B:
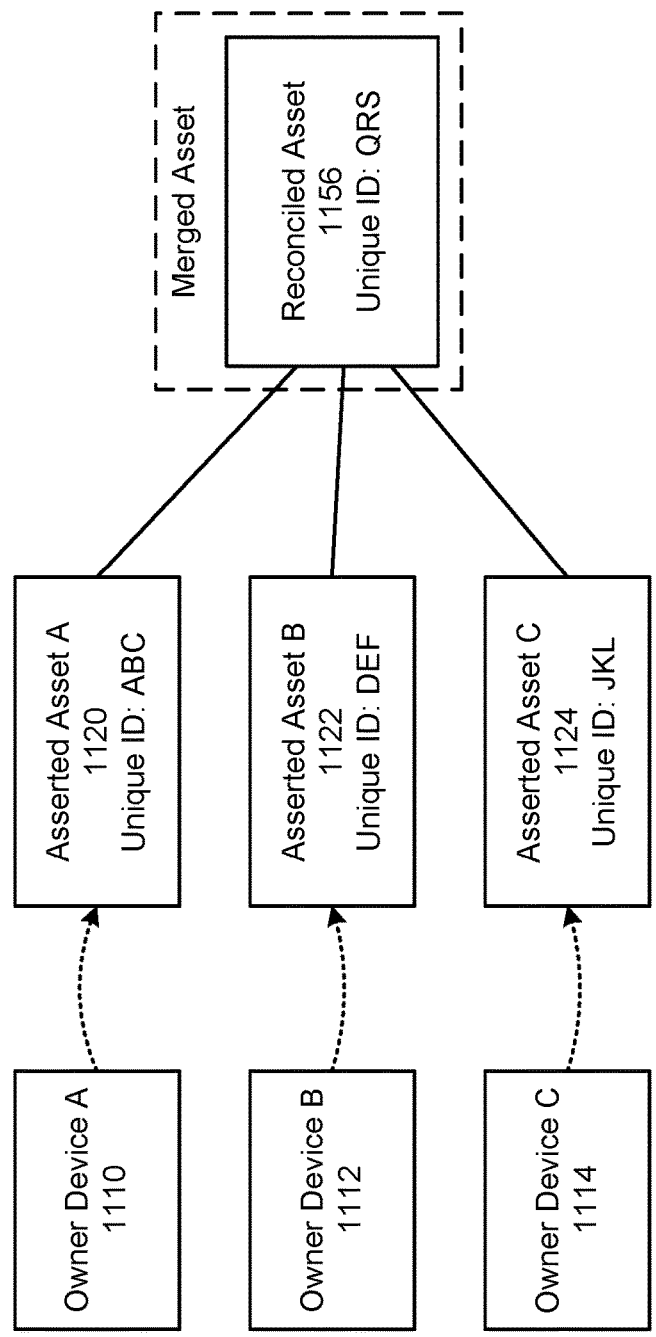
FIG. 11B illustrates a second example state of owner devices, asserted assets, and reconciled assets in a rights system where the additional asserted asset causes existing reconciled assets to be merged, according to some embodiments.

FIG. 11B illustrates a second example state of owner devices, asserted assets, and reconciled assets in a rights system where the additional asserted asset information (provided by the third owner through the owner device C 714) causes existing reconciled assets 1150 and 1152 to be merged, according to one embodiment. The merging, according to some embodiments, is a result of the descriptive data associated with the reconciled asset 1150 and the reconciled asset 1152 each overlapping with the descriptive data associated with the asserted asset C 1124. The state 1101 of FIG. 11B can represent a state after the completion of the process 1000 of FIG. 10, and therefore a state later in time than the state 1100 of FIG. 11A. The state 1101 of FIG. 11B includes owner devices A 1110, B 1112, and C 1114, asserted assets A 1120, B 1122, and C 1124, and a merged reconciled asset 1156.

After the process 1000 has completed, the reconciled assets 1150 and 1152 have been merged into the reconciled asset 1156. In this example, the reconciled asset 1156 is associated with the asserted assets A 1120 and B 1122 previously associated with the reconciled assets 1150 and 1152, as well as the asserted asset C 1124. As discussed above in section III, a historical copy of the reconciled assets 1150 and 1152 can be stored for archival purposes.

VIII. Claim Generation

Figure 12:
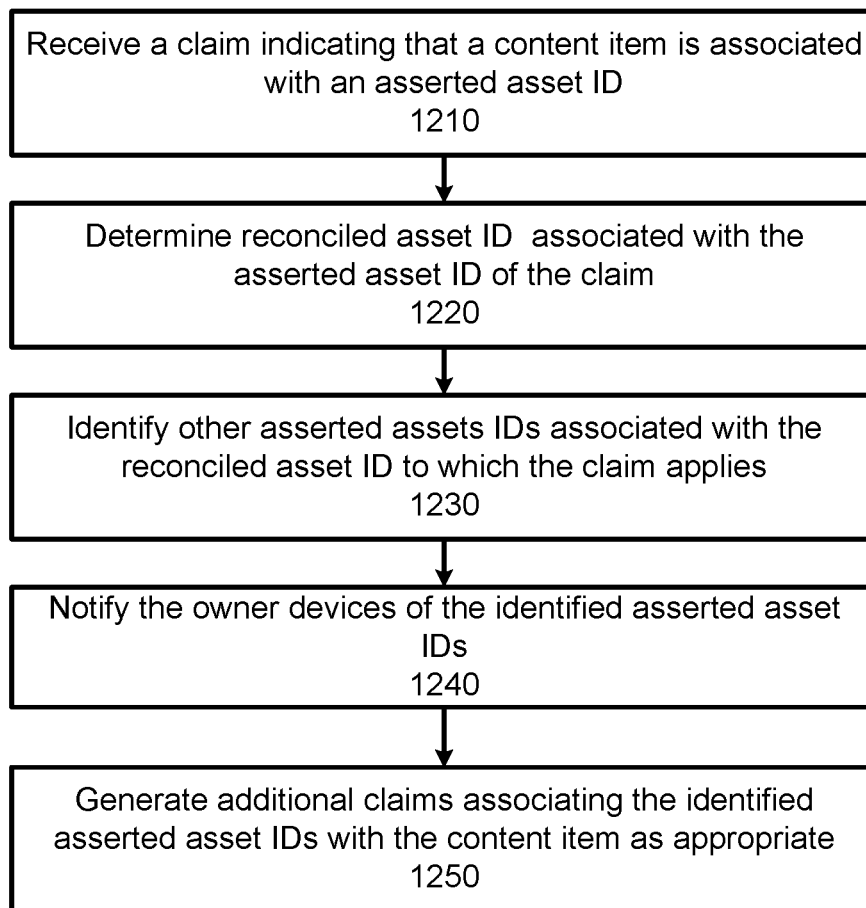
FIG. 12 is a flowchart describing an example process for generating claims in a rights system, according to some embodiments.

FIG. 12 is a flowchart describing an example process for generating claims in a rights system, according to some embodiments. The process 1200 includes the rights system 120 receiving 1210 a claim indicating that a content item is associated with an asserted asset, for example via an ID of the asserted asset. The rights system 120 can then determine 1220 a reconciled asset associated with the asserted asset of the claim, for example by using the asserted asset ID included in the claim. Subsequently, other asserted assets associated with the determined reconciled asset can be identified 1230 by the rights system, and owners of the identified asserted assets can be notified 1240. The rights system 120 can generate 1250 additional claims associating the identified asserted assets with the content item as appropriate, for example based on receiving a response to the notification from one or more owners of the identified asserted assets.

IX. Additional Considerations

Figure 13:
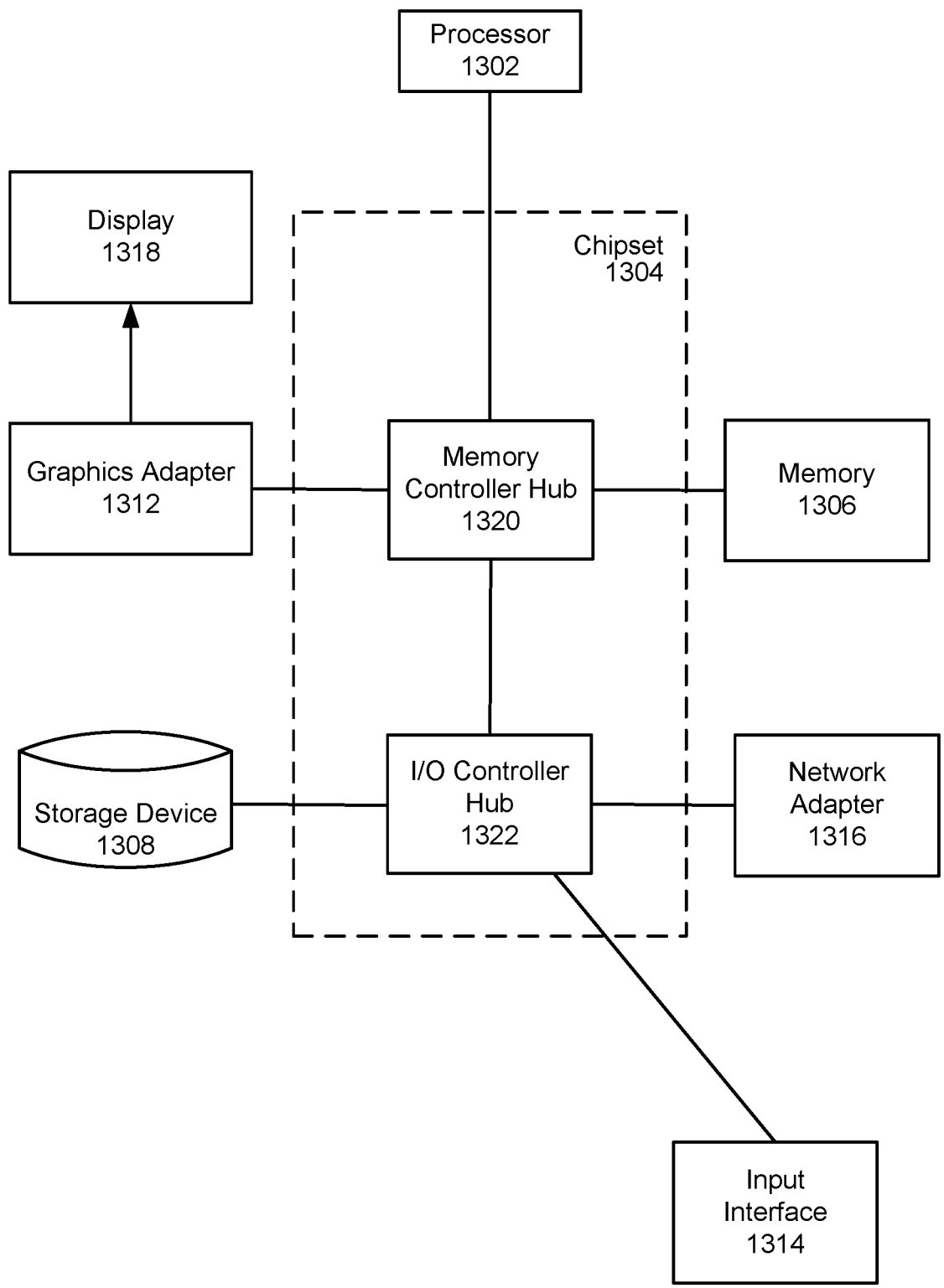
FIG. 13 is a block diagram of an example computer system which can operate a rights system, according to some embodiments.

FIG. 13 is a block diagram of a basic example computing device 1300 which can be specifically configured to operate any one or more of a rights system 120, a content system 125 an owner device 130 The computing device 1300 includes at least one processor 1302 coupled to a chipset 1304. The chipset 1304 includes a memory controller hub 1320 and an input/output (I/O) controller hub 1322. A memory 1306 and a graphics adapter 1312 are coupled to the memory controller hub 1320, and a display 1318 is coupled to the graphics adapter 1312. A storage device 1308, an input device 1314, and network adapter 1316 are coupled to the I/O controller hub 1322. Other embodiments of the computer 1300 have different architectures.

The storage device 1308 is a non-transitory computer-readable storage medium such as a hard drive, compact disk read-only memory (CD-ROM), DVD, or a solid-state memory device. The memory 1306 holds instructions and data used by the processor 1302. The input interface 1314 is a touch-screen interface, a mouse, track ball, or other type of pointing device, a keyboard, or some combination thereof, and is used to input data into the computer 1300. In some embodiments, the computer 300 may be configured to receive input (e.g., commands) from the input interface 1314 via gestures from the user. The graphics adapter 1312 displays images and other information on the display 1318. The network adapter 1316 couples the computer 1300 to one or more computer networks.

The types of computers 1300 used by the entities of FIG. 1 can vary depending upon the embodiment and the processing power required by the entity. For example, the rights system 120 can run in a single computer 1300 or multiple computers 1300 communicating with each other through a network such as in a server farm. The computers 1300 can lack some of the components described above, such as graphics adapters 1312, and displays 1318.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof. For example, the computer 1300 is adapted to execute computer program modules for providing functionality described herein. In one embodiment, program modules are stored on the storage device 1308, loaded into the memory 1306, and executed by the processor 1302.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

While particular embodiments and applications have been illustrated and described herein, it is to be understood that the described subject matter is not limited to the precise construction and components disclosed herein and that various modifications, changes and variations which will be apparent to those skilled in the art may be made in the arrangement, operation and details of the methods and systems disclosed herein.

What is claimed is:

1. A method comprising:
    receiving, from a user device, information identifying a first asset and a first owner;
    generating, by a processing device, a first asserted asset data object associating the first asset with the first owner, wherein the first asserted asset data object comprises one or more first sets of data, wherein one of the first sets of data is first descriptive data associating the first asset with the first owner;
    maintaining, in a data store, a plurality of asserted asset data objects, the plurality of asserted asset data objects including at least:
        the first asserted asset data object comprising the first descriptive data associating the first asset and the first owner, and
        a second asserted asset data object comprising second descriptive data associating a second asset and a second owner;
    determining, by the processing device and based on the first descriptive data and the second descriptive data, that the first asset and the second asset are the same asset and that the first owner and the second owner are different owners;
    generating, by the processing device, a first reconciled asserted asset data object associated with the first asserted asset data object and the second asserted asset data object, in response to determining that the first asset and the second asset are the same asset and the first owner and the second owner are different owners, wherein the first reconciled asserted asset data object comprises one or more second sets of data that are different from the first sets of data;
    maintaining, in the data store, a plurality of reconciled asserted asset data objects, wherein each reconciled asserted asset data object comprises one or more set of data, and each reconciled asserted asset data object associated with one or more asserted asset data objects, the plurality of reconciled asserted asset data objects including at least:
        the first reconciled asserted asset data object associated with the first asserted asset data object and the second asserted asset data object;
    determining, by the processing device, a degree of overlap between one or more third sets of data associated with a third asserted asset data object and the one or more sets of data of each reconciled asserted asset data object;
    determining, by the processing device, a ranking of the plurality of reconciled asserted asset data objects based on the degree of overlap;
    determining a reconciled asserted asset data object with a highest ranking;
    associating, by the processing device, the third asserted asset data object with the reconciled asserted asset data object with the highest ranking;
    receiving, by the processing device, a modification to the second descriptive data, where the modified second descriptive data conflicts at least in part with the first descriptive data;
    identifying, by the processing device, a first subset of the plurality of asserted asset data objects, each asserted asset data object in the first subset comprising descriptive data that overlaps at least in part with the first descriptive data;
    identifying, by the processing device, a second subset of the plurality of asserted asset data objects, each asserted asset data object in the second subset comprising descriptive data that overlaps at least in part with the modified second descriptive data;
    generating, by the processing device, a first split reconciled asserted asset data object associated with the first subset of the plurality of asserted asset data objects;

associating the first split reconciled asserted asset data object with the first subset of the plurality of asserted asset data objects;

generating, by the processing device, a second split reconciled asserted asset data object associated with the second subset of the plurality of asserted asset data objects; and associating the second split reconciled asserted asset data object with the second subset of the plurality of asserted asset data objects.

2. The method of claim 1, wherein receiving a modification to the second descriptive data comprises receiving an updated second asserted asset data object from an owner device associated with the second owner of the second asserted asset data object.

3. The method of claim 1, wherein maintaining a plurality of asserted asset data objects comprises:

maintaining a table structure, a subset of rows of the table structure comprising the plurality of asserted asset data objects, each row representing an asserted asset data object and including descriptive data associating an asset with an owner, an ID of the asserted asset data object, and an ID of a corresponding reconciled asserted asset data object; and wherein the table structure comprises a row representing the first asserted asset data object and a row representing the second asserted asset data object.

4. The method of claim 3, wherein maintaining a plurality of reconciled asserted asset data objects comprises:

maintaining in the table structure, a second subset of rows of the table structure comprising the plurality of reconciled asserted asset data objects, each row representing a reconciled asserted asset data object and including an ID of the reconciled asserted asset data object and IDs of asserted asset data objects corresponding to the reconciled asserted asset data object; and wherein the table structure comprises a row representing the first reconciled asserted asset data object.

5. The method of claim 4, wherein generating the first split reconciled asserted asset data object associated with the first subset of the plurality of asserted asset data objects comprises:

modifying, in the table structure, the row corresponding to the first split reconciled asserted asset data object to comprise an ID of the first split reconciled asserted asset data object and the IDs of the asserted asset data objects of the first subset of the plurality of asserted asset data objects; and wherein generating the second split reconciled asserted asset data object associated with the second subset of the plurality of asserted asset data objects comprises:

modifying, in the table structure, the row corresponding to the second split reconciled asserted asset data object to comprise an ID of the second split reconciled asserted asset data object and the IDs of the asserted asset data objects of the second subset of the plurality of asserted asset data objects.

6. The method of claim 1, wherein one of the first split reconciled asserted asset data object and the second split reconciled asserted asset data object is the first reconciled asserted asset data object.

7. The method of claim 1, wherein generating the first split reconciled asserted asset data object associated with the first subset of the plurality of asserted asset data objects comprises:

associating the descriptive data associated with asserted asset data objects of the first subset of the plurality of asserted asset data objects with the first split reconciled asserted asset data object; and wherein generating the second split reconciled asserted asset data object associated with the second subset of the plurality of asserted asset data objects comprises:

associating the descriptive data associated with asserted asset data objects of the second subset of the plurality of asserted asset data objects with the second split reconciled asserted asset data object.

8. A non-transitory computer readable medium comprising instructions that when executed by a processor, cause the processor to perform operations comprising:

receiving, from a user device, information identifying a first asset and a first owner;

generating a first asserted asset data object associating the first asset with the first owner, wherein the first asserted asset data object comprises one or more first sets of data, wherein one of the first sets of data is first descriptive data associating the first asset with the first owner;

maintaining, in a data store, a plurality of asserted asset data objects, the plurality of asserted asset data objects including at least:

the first asserted asset data object comprising the first descriptive data associating the first asset and the first owner, and a second asserted asset data object comprising second descriptive data associating a second asset and a second owner;

determining, based on the first descriptive data and the second descriptive data, that the first asset and the second asset are the same asset and that the first owner and the second owner are different owners;

generating a first reconciled asserted asset data object associated with the first asserted asset data object and the second asserted asset data object, in response to determining that the first asset and the second asset are the same asset and the first owner and the second owner are different owners, wherein the first reconciled asserted asset data object comprises one or more second sets of data that are different from the first sets of data;

maintaining, in the data store, a plurality of reconciled asserted asset data objects, wherein each reconciled asserted asset data object comprises one or more set of data, and each reconciled asserted asset data object associated with one or more asserted asset data objects, the plurality of reconciled asserted asset data objects including at least:

the first reconciled asserted asset data object associated with the first asserted asset data object and the second asserted asset data object;

determining a degree of overlap between one or more third sets of data associated with a third asserted asset data object and the one or more sets of data of each reconciled asserted asset data object;

determining a ranking of the plurality of reconciled asserted asset data objects based on the degree of overlap;

determining a reconciled asserted asset data object with a highest ranking;

associating the third asserted asset data object with the reconciled asserted asset data object with the highest ranking;

receiving a modification to the second descriptive data, where the modified second descriptive data conflicts at least in part with the first descriptive data;

identifying a first subset of the plurality of asserted asset data objects, each asserted asset data object in the first subset comprising descriptive data that overlaps at least in part with the first descriptive data;

identifying a second subset of the plurality of asserted asset data objects, each asserted asset data object in the second subset comprising descriptive data that overlaps at least in part with the modified second descriptive data;

generating a first split reconciled asserted asset data object associated with the first subset of the plurality of asserted asset data objects;

associating the first split reconciled asserted asset data object with the first subset of the plurality of asserted asset data objects;

generating a second split reconciled asserted asset data object associated with the second subset of the plurality of asserted asset data objects; and associating the second split reconciled asserted asset data object with the second subset of the plurality of asserted asset data objects.

9. The non-transitory computer readable medium of claim 8, wherein receiving a modification to the second descriptive data comprises receiving an updated second asserted asset data object from an owner device associated with the second owner of the second asserted asset data object.

10. The non-transitory computer readable medium of claim 8, wherein maintaining a plurality of asserted asset data objects comprises:

maintaining a table structure, a subset of rows of the table structure comprising the plurality of asserted asset data objects, each row representing an asserted asset data object and including descriptive data associating an asset with an owner, an ID of the asserted asset data object, and an ID of a corresponding reconciled asserted asset data object; and wherein the table structure comprises a row representing the first asserted asset data object and a row representing the second asserted asset data object.

11. The non-transitory computer readable medium of claim 10, wherein maintaining a plurality of reconciled asserted asset data objects comprises:

maintaining in the table structure, a second subset of rows of the table structure comprising the plurality of reconciled asserted asset data objects, each row representing a reconciled asserted asset data object and including an ID of the reconciled asserted asset data object and IDs of asserted asset data objects corresponding to the reconciled asserted asset data object; and wherein the table structure comprises a row representing the first reconciled asserted asset data object.

12. The non-transitory computer readable medium of claim 11, wherein generating the first split reconciled asserted asset data object associated with the first subset of the plurality of asserted asset data objects comprises:

modifying, in the table structure, the row corresponding to the first split reconciled asserted asset data object to comprise an ID of the first split reconciled asserted asset data object and the IDs of the asserted asset data objects of the first subset of the plurality of asserted asset data objects; and wherein generating the second split reconciled asserted asset data object associated with the second subset of the plurality of asserted asset data objects comprises:

modifying, in the table structure, the row corresponding to the second split reconciled asserted asset data object to comprise an ID of the second split reconciled asserted asset data object and the IDs of the asserted asset data objects of the second subset of the plurality of asserted asset data objects.

13. The non-transitory computer readable medium of claim 8, wherein one of the first split reconciled asserted asset data object and the second split reconciled asserted asset data object is the first reconciled asserted asset data object.

14. The non-transitory computer readable medium of claim 8, wherein generating the first split reconciled asserted asset data object with the first subset of the plurality of asserted asset data objects comprises:

associating the descriptive data associated with asserted asset data objects of the first subset of the plurality of asserted asset data objects with the first split reconciled asserted asset data object; and wherein generating the second split reconciled asserted asset data object associated with the second subset of the plurality of asserted asset data objects comprises:

associating the descriptive data associated with asserted asset data objects of the second subset of the plurality of asserted asset data objects with the second split reconciled asserted asset data object.

15. A system comprising:

a memory; and at least one computer processor coupled to the memory and configured to:

receive, from a user device, information identifying a first asset and a first owner;

generate a first asserted asset data object associating the first asset with the first owner, wherein the first asserted asset data object comprises one or more first sets of data, wherein one of the first sets of data is first descriptive data associating the first asset with the first owner;

maintain, in a data store, a plurality of asserted asset data objects, the plurality of asserted asset data objects including at least:

the first asserted asset data object comprising the first descriptive data associating the first asset and the first owner, and a second asserted asset data object comprising second descriptive data associating a second asset and a second owner;

determine, based on the first descriptive data and the second descriptive data, that the first asset and the second asset are the same asset and that the first owner and the second owner are different owners;

generate a first reconciled asserted asset data object associated with the first asserted asset data object and the second asserted asset data object, in response to determining that the first asset and the second asset are the same asset and the first owner and the second owner are different owners, wherein the first reconciled asserted asset data object comprises one or more second sets of data that are different from the first sets of data;

maintain, in the data store, a plurality of reconciled asserted asset data objects, wherein each reconciled asserted asset data object comprises one or more set of data, and each reconciled asserted asset data object associated with one or more asserted asset data objects, the plurality of reconciled asserted asset data objects including at least:

the first reconciled asserted asset data object associated with the first asserted asset data object and the second asserted asset data object;

determine a degree of overlap between one or more third sets of data associated with a third asserted asset data object and the one or more sets of data of each reconciled asserted asset data object;

determine a ranking of the plurality of reconciled asserted asset data objects based on the degree of overlap;

determining a reconciled asserted asset data object with a highest ranking;

associate the third asserted asset data object with the reconciled asserted asset data object with the highest ranking;

receive a modification to the second descriptive data, where the modified second descriptive data conflicts at least in part with the first descriptive data;

identify a first subset of the plurality of asserted asset data objects, each asserted asset data object in the first subset comprising descriptive data that overlaps at least in part with the first descriptive data;

identify a second subset of the plurality of asserted asset data objects, each asserted asset data object in the second subset comprising descriptive data that overlaps at least in part with the modified second descriptive data;

generate a first split reconciled asserted asset data object associated with the first subset of the plurality of asserted asset data objects;

associate the first split reconciled asserted asset data object with the first subset of the plurality of asserted asset data objects;

generate a second split reconciled asserted asset data object associated with the second subset of the plurality of asserted asset data objects; and associate the second split reconciled asserted asset data object with the second subset of the plurality of asserted asset data objects.

16. The system of claim 15, wherein receiving a modification to the second descriptive data comprises receiving an updated second asserted asset data object from an owner device associated with the second owner of the second asserted asset data object.

17. The system of claim 15, wherein maintaining a plurality of asserted asset data objects comprises:

maintaining a table structure, a subset of rows of the table structure comprising the plurality of asserted asset data objects, each row representing an asserted asset data object and including descriptive data associating an asset with an owner, an ID of the asserted asset data object, and an ID of a corresponding reconciled asserted asset data object; and wherein the table structure comprises a row representing the first asserted asset data object and a row representing the second asserted asset data object.

18. The system of claim 17, wherein maintaining a plurality of reconciled asserted asset data objects comprises:

maintaining in the table structure, a second subset of rows of the table structure comprising the plurality of reconciled asserted asset data objects, each row representing a reconciled asserted asset data object and including an ID of the reconciled asserted asset data object and IDs of asserted asset data objects corresponding to the reconciled asserted asset data object; and wherein the table structure comprises a row representing the first reconciled asserted asset data object.

19. The system of claim 18, wherein generating the first split reconciled asserted asset data object associated with the first subset of the plurality of asserted asset data objects comprises:

modifying, in the table structure, the row corresponding to the first split reconciled asserted asset data object to comprise an ID of the first split reconciled asserted asset data object and the IDs of the asserted asset data objects of the first subset of the plurality of asserted asset data objects; and wherein generating the second split reconciled asserted asset data object associated with the second subset of the plurality of asserted asset data objects comprises:

modifying, in the table structure, the row corresponding to the second split reconciled asserted asset data object to comprise an ID of the second split reconciled asserted asset data object and the IDs of the asserted asset data objects of the second subset of the plurality of asserted asset data objects.

20. The system of claim 15, wherein one of the first split reconciled asserted asset data object and the second split reconciled asserted asset data object is the first reconciled asserted asset data object.

* * * * *